United States Patent
Pang et al.

(10) Patent No.: US 6,446,204 B1
(45) Date of Patent: *Sep. 3, 2002

(54) METHOD AND APPARATUS FOR IMPLEMENTING AN EXTENSIBLE AUTHENTICATION MECHANISM IN A WEB APPLICATION SERVER

(75) Inventors: Robert Pang, Mountain View; Jim Stabile, Los Altos, both of CA (US)

(73) Assignee: Oracle Corporation, Redwood Shores, CA (US)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/961,796

(22) Filed: Oct. 31, 1997

(51) Int. Cl.[7] ................................. H04L 9/00

(52) U.S. Cl. ..................................... 713/153

(58) Field of Search ................... 395/200.33, 200.47, 395/200.51, 200.59; 713/168, 170, 153, 154, 155, 201; 709/229, 225, 219, 202

(56) References Cited

U.S. PATENT DOCUMENTS

| | | | |
|---|---|---|---|
| 5,546,584 A | * 8/1996 | Lundin et al. | 395/700 |
| 5,649,099 A | 7/1997 | Theimer et al. | 395/187.01 |
| 5,812,776 A | * 9/1998 | Gifford | 395/200.47 |
| 5,815,574 A | * 9/1998 | Fortinsky | 380/25 |
| 5,903,732 A | * 5/1999 | Reed et al. | 395/200.59 |
| 5,987,232 A | * 11/1999 | Tabuki | 395/187.01 |

FOREIGN PATENT DOCUMENTS

EP 0 733 969 A1 9/1996

OTHER PUBLICATIONS

Edwards, N., et al., "High security Web servers and gateways," Computer Networks and ISDN Systems, vol. 29, No. 8–13, Sep. 1997, pp. 927–938.

(List continued on next page.)

Primary Examiner—Gail Hayes
Assistant Examiner—Bryan Latham
(74) Attorney, Agent, or Firm—Hickman Palermo Truong & Becker LLP; Edward A. Becker; Carl L. Brandt

(57) ABSTRACT

A highly scalable, flexible, and extensible mechanism is provided for authenticating a request from a client. In a preferred embodiment, the invention comprises an authentication engine, an authentication host, a plurality of providers coupled to the host which implement selected authentication schemes, and a machine independent communication mechanism which enables the various components to communicate with each other irregardless of the machine each component resides on. The communication mechanism enables the invention to be distributed, which in turn, makes the invention highly scalable. In operation, the authentication engine receives a request having associated therewith a protect string. The protect string specifies the authentication scheme or schemes that need to be implemented for that request. The authentication engine parses the protect string into one or more provider requests, and sends the requests to the authentication host. In response, the host forwards the requests to the appropriate providers for processing. The results of the providers' processing are sent back to the authentication engine, which then processes the results according to the protect string to determine whether the request has been authenticated. With the present invention, it is possible to add providers to the system, or to substitute a new provider for an existing provider, without changing or recompiling any other component in the system. It is also possible to change the authentication schemes associated with a request by simply changing the protect string. These aspects of the invention make it possible to change implementation at deployment time, as opposed to compile time. This makes the invention highly flexible and extensible.

36 Claims, 10 Drawing Sheets

OTHER PUBLICATIONS

Web Application Server 3.0.1 "Overview", published Aug. 14, 1998.

Oracle "Developing Your Own Web Application Server™ Cartridge" Release 3.0.1, published Aug. 14, 1998.

Oracle Web Application Server™, "Installation Guide for Sun SPARC Solaris 2.x" Release 3.0.1, published Aug. 14, 1998.

Oracle "Using Oracle Web Application Server™ Cartridge" Release 3.0.1, published Aug. 14, 1998.

Oracle "Performance Tuning", Operating System Parameters (Sun Solaris), published Aug. 14, 1998.

Oracle "Security", "Security Overview", published Aug. 14, 1998.

Oracle Glossary (A–X), published Aug. 14, 1998.

Executive Overview; Oracle Web Application Server™ 3.0; http://www.silexsa.com/oracle/was30 eo.htm; retrieved May 11, 2000.

Oracle Corporation; Oracle WebServer Architecture; Seshu Adunuthula, Mala Anand, Ankur Sharma; http://www.win-.tue.nl/00www/anand.html; dated Apr. 1996; retieved May 10, 2000.

Distributed Objects on the Internet: Oracle Web Application Server™ 3.0; Richard Delval–Duarte; http://www.fors.com/eoug97/papers/0504.htm; dated Nov. 1996; retrieved May 10, 2000.

Oracle Corporation; WRB API Overview; http://www.cs-.vu.nl/~eliens/WWW5/papers/Broker.html; retrieved.

Web Application Server 3.0 "Oracle Web Application Server Documentation Roadmap".

Oracle Web Application Server™ Installation Guide for Sun SPARC Solaris 2.x, Release 3.0.

Oracle Web Application Server™ Overview, Release 3.0.

Oracle Web Application Server™ Cartridge User's Guide, Release 3.0.

Web Request Broker ™Programmer's Reference, Release 3.0.

Rigney Steve, A Firewall That You Can Afford, Computer Shopper, Jul. 1997, p. 465.*

Web Page containing an article written by Rich Levin titled "NetDynamics To Launch Web Database Development System Upgrade," Sep. 29, 1997 (As printed on Dec. 11, 1997).

KIVA Software Corporation, "Developing and Managing Web–based Enterprise Applications."

Merle, P., et al., "CorbaWeb: A generic object navigator", Computer Networks and ISDN Systems, vol. 28, No. 11, May 1996.

* cited by examiner

| INSTANCE | CARTRIDGE | STATUS |
|----------|-----------|--------|
| 1 | C1 | BUSY |
| 3 | C1 | FREE |
| 7 | C1 | BUSY |
| 1 | C2 | BUSY |
| 5 | C2 | FREE |
| 3 | C3 | BUSY |

FIG. 4

|  | 502 | 504 | 506 | 508 |
|---|---|---|---|---|
|  | INSTANCE | CARTRIDGE | LISTENER | MACHINE |
| 510 → | 1 | C1 | L210 | M1 |
|  | 3 | C1 | L210 | M2 |
|  | 7 | C1 | L210 | M3 |
|  | 1 | C2 | L210 | M1 |
|  | 5 | C2 | L210 | M1 |
| 512 → | 3 | C3 | L210 | M3 |
|  | 2 | C1 | L216 | M1 |
|  | 4 | C1 | L216 | M2 |
|  | 5 | C1 | L216 | M3 |
|  | 3 | C2 | L216 | M1 |
|  | 4 | C2 | L216 | M1 |
|  | 1 | C3 | L216 | M3 |
|  | 2 | C2 | UNOWNED | M1 |
|  | 2 | C3 | UNOWNED | M2 |

FIG. 5

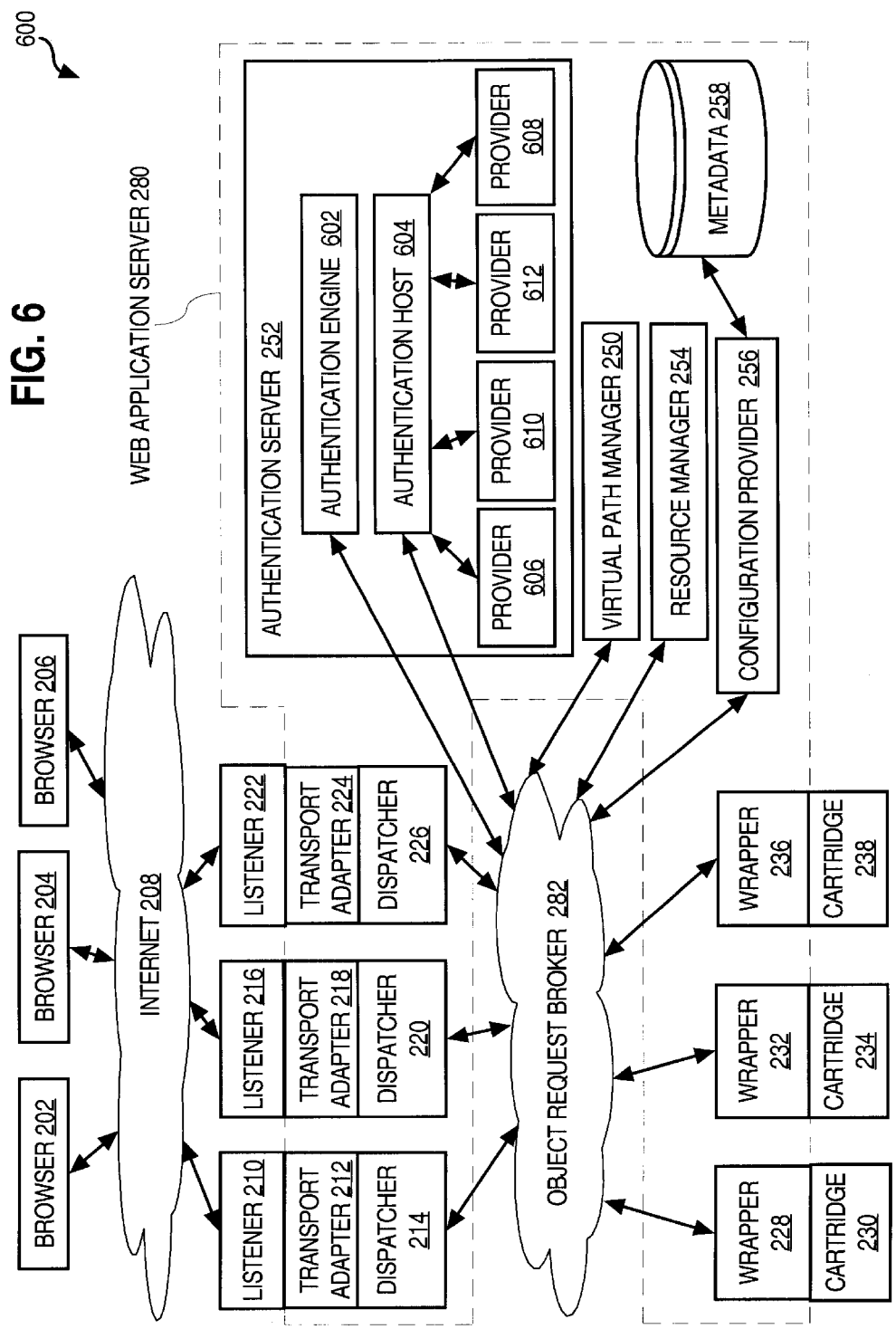

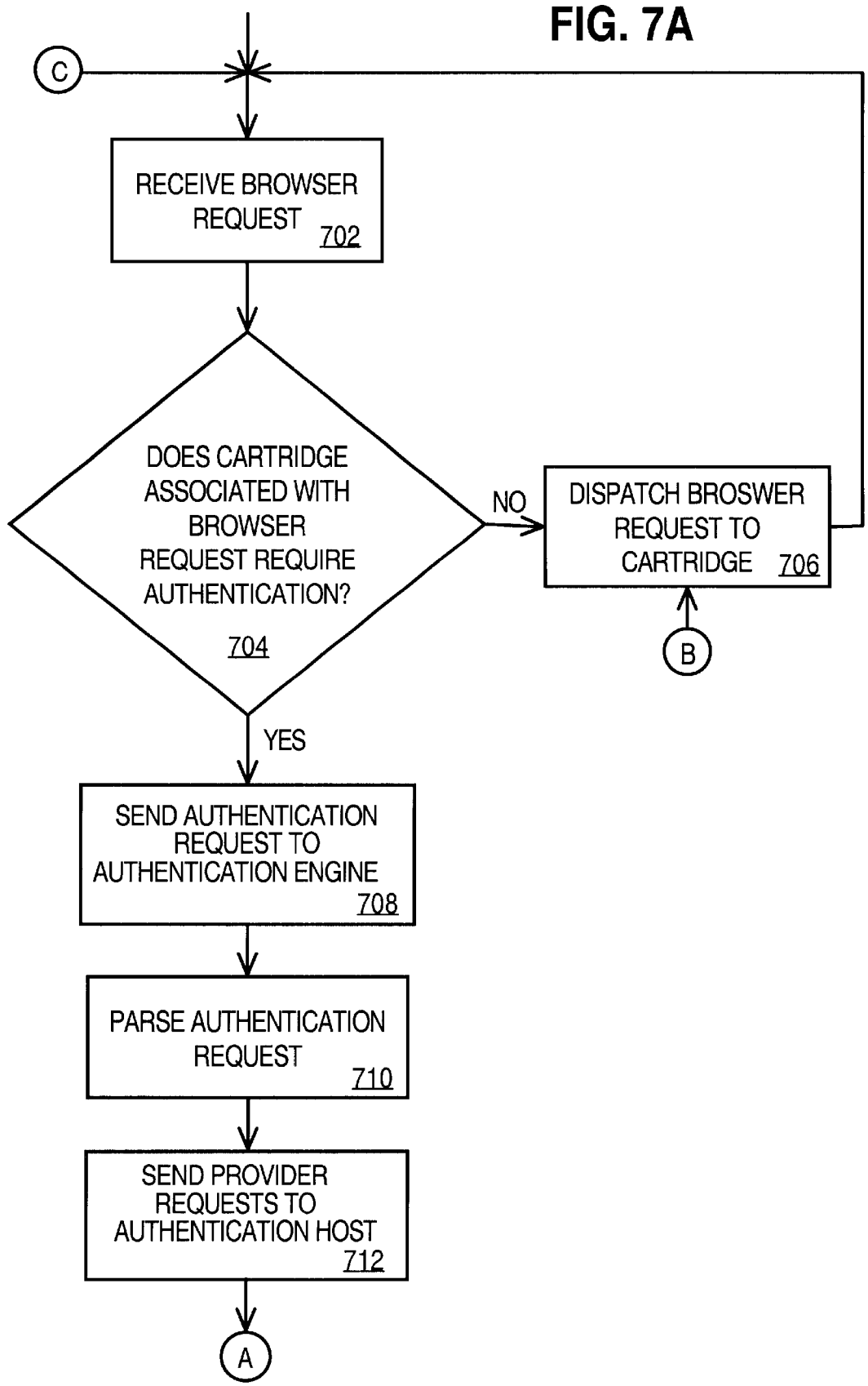

METHOD AND APPARATUS FOR IMPLEMENTING AN EXTENSIBLE AUTHENTICATION MECHANISM IN A WEB APPLICATION SERVER

FIELD OF THE INVENTION

This invention relates to authenticating client operations in networked computer systems, more specifically to authenticating browser requests in a stateless web environment.

BACKGROUND OF THE INVENTION

The World Wide Web includes a network of servers on the Internet, each of which is associated with one or more HTML (Hypertext Markup Language) pages. The HTML pages associated with a server provide information and hypertext links to other documents on that and (usually) other servers. Servers communicate with clients by using the Hypertext Transfer Protocol (HTTP). The servers listen for requests from clients for their HTML pages, and are therefore often referred to as "listeners".

Users of the World Wide Web use a client program, referred to as a browser, to request, decode and display information from listeners. When the user of a browser selects a link on an HTML page, the browser that is displaying the page sends a request over the Internet to the listener associated with the Universal Resource Locator (URL) specified in the link. In response to the request, the listener transmits the requested information to the browser that issued the request. The browser receives the information, presents the received information to the user, and awaits the next user request.

Traditionally, the information stored on listeners is in the form of static HTML pages. Static HTML pages are created and stored at the listener prior to a request from a web browser. In response to a request, a static HTML page is merely read from storage and transmitted to the requesting browser. Currently, there is a trend to develop listeners that respond to browser requests by performing dynamic operations. For example, a listener may respond to a request by issuing a query to a database, dynamically constructing a web page containing the results of the query, and transmitting the dynamically constructed HTML page to the requesting browser. To perform dynamic operations, the functionality of the listener must be enhanced or augmented. Various approaches have been developed for extending listeners to support dynamic operations.

Because servers on the Internet can be accessed by a multitude of clients, several protection schemes have been developed to protect against unauthorized access of certain information. One approach used to prevent unauthorized access of certain information is to require clients to provide certain authorization information before they can have access to information on a particular server. This authorization information typically consists of such items as a user's name and a password, a particular IP address, specific domain name or other information that can identify a particular user and/or machine attempting to access information.

One approach to implementing an authorization mechanism is to associate an authentication process with each server. The authorization process intercepts client requests and determines whether the clients should have access to the information associated with the server. Thus, each time a client attempts to access information on a particular server, the authentication process associated with the server first verifies that the client is authorized to access the information.

This authentication-process-per-server approach works well when the HTML pages associated with the server are the items to be protected. However, in systems that use the server to access and execute computer programs that may be running on different machines than the server, this approach may not provide the requisite flexibility. For example, assume that a banking application and a database application are both accessible by browsers through a particular server. The banking application may require a completely different authentication mechanism than the database application, while other uses of the server may not require any authentication at all.

Based on the foregoing, it is clearly desirable to provide an authentication mechanism to restrict access to resources available through an HTTP server. It is further desirable to provide an authentication mechanism that is flexible enough to support different authentication protocols for applications that may be accessed through the same HTTP server.

SUMMARY OF THE INVENTION

The present invention provides a highly scalable, flexible, and extensible mechanism for authenticating a request from a client. In a preferred embodiment, the present invention comprises an authentication engine, an authentication host, and a plurality of providers coupled to the host, each provider implementing a selected authentication scheme. In a preferred embodiment, each of the providers takes the form of a module that can be dynamically linked in at run time, such as a dynamic link library (DLL).

The present invention preferably further comprises a machine independent communication mechanism for enabling the various components to communicate with each other across machine boundaries. With this communication mechanism, the various components of the invention are able to communicate with each other regardless of on which machine each component resides. In a preferred embodiment, the communication mechanism takes the form of an object request broker. Because the various components can reside on different machines, the present invention is said to be distributed. The distributed nature of the present invention makes it highly scalable.

In addition to acting as a communication mechanism, the object request broker also preferably performs a load balancing function. More particularly, the broker coordinates the sending of requests to the authentication engine and the authentication host in such a way that it minimizes potential bottlenecks and maximizes use of available resources. In performing this function, the broker utilizes metadata that is registered for each provider at the time the provider is introduced into the system.

In operation, the authentication engine receives a request having a protect string associated therewith. The protect string specifies, among other things, the authentication scheme or schemes that need to be implemented for that request, and the logical operator or operators (e.g. AND, OR) that are to be applied to the results of those schemes. Upon receiving the request, the authentication engine parses the protect string into one or more provider requests, and sends the requests, via the object request broker, to the authentication host. In response, the host forwards the requests to the appropriate providers for processing. The providers, upon completing their processing, send the results, via the authentication host and the object request broker, back to the authentication engine, which then processes the results according to the logical operator or operators specified in the protect string to determine whether the request has been authenticated.

With the present invention, it is possible to alter system implementation at deployment time. As noted previously, each provider preferably takes the form of a DLL that can be linked into the system at run time. Because the providers are linked in at run time, it is possible, at deployment time, to: (1) replace one provider with another provider; and (2) to add another provider to the system. The architecture of the present invention enables all of this to be done without changing or recompiling any of the other modules (e.g. the authentication engine and the authentication host). To replace/add a provider, all that needs to be done is to update the metadata to reflect the replacement/addition of the providers. In addition, it is possible to change the authentication schemes associated with a particular query. This can be done by simply changing the protect string associated with that query. Again, no recompilation is necessary. These aspects of the invention make it possible to change implementation at deployment time, as opposed to compile time. This in turn makes the present invention highly flexible and extensible.

These and other advantages will become clear as the invention is described in further detail.

BRIEF DESCRIPTION OF THE DRAWINGS

The present invention is illustrated by way of example, and not by way of limitation, in the figures of the accompanying drawings and in which like reference numerals refer to similar elements and in which:

FIG. 4 is a block diagram of a table containing information maintained by a dispatcher according to an embodiment of the invention;

FIG. 5 is a lock diagram of a table containing information maintained by a resource manager according to an embodiment of the invention;

FIG. 6 is a block diagram of a distributed application server that provides for an extensible authentication mechanism in a stateless web environment according to one embodiment of the invention;

FIG. 7A is a portion of a flow chart illustrating steps for authenticating a browser request according to an embodiment of the invention;

DETAILED DESCRIPTION OF THE PREFERRED EMBODIMENT

A method and apparatus for authenticating browser requests in a stateless web environment is described. In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention.

Hardware Overview

Figure 1:
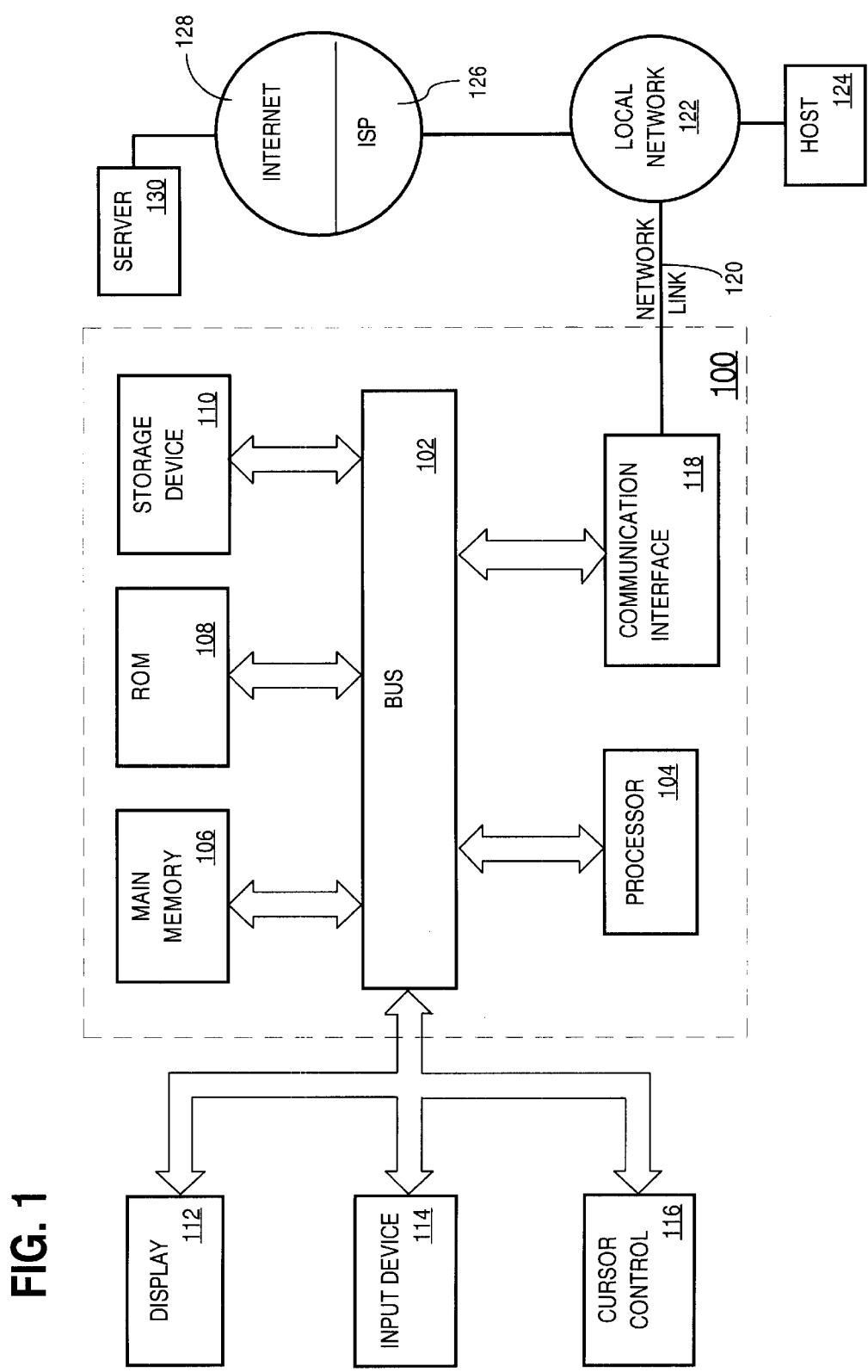
FIG. 1 is a block diagram of a computer system upon which an embodiment of the invention may be implemented.

FIG. 1 is a block diagram that illustrates a computer system 100 upon which an embodiment of the invention may be implemented. Computer system 100 includes a bus 102 or other communication mechanism for communicating information, and a processor 104 coupled with bus 102 for processing information. Computer system 100 also includes a main memory 106, such as a random access memory (RAM) or other dynamic storage device, coupled to bus 102 for storing information and instructions to be executed by processor 104. Main memory 106 also may be used for storing temporary variables or other intermediate information during execution of instructions to be executed by processor 104. Computer system 100 further includes a read only memory (ROM) 108 or other static storage device coupled to bus 102 for storing static information and instructions for processor 104. A storage device 110, such as a magnetic disk or optical disk, is provided and coupled to bus 102 for storing information and instructions.

Computer system 100 may be coupled via bus 102 to a display 112, such as a cathode ray tube (CRT), for displaying information to a computer user. An input device 114, including alphanumeric and other keys, is coupled to bus 102 for communicating information and command selections to processor 104. Another type of user input device is cursor control 116, such as a mouse, a trackball, or cursor direction keys for communicating direction information and command selections to processor 104 and for controlling cursor movement on display 112. This input device typically has two degrees of freedom in two axes, a first axis (e.g., x) and a second axis (e.g., y), that allows the device to specify positions in a plane.

The invention is related to the use of computer system 100 to perform authentication of browser requests in a stateless web environment. According to one embodiment of the invention, authentication of browser requests is performed by computer system 100 in response to processor 104 executing one or more sequences of one or more instructions contained in main memory 106. Such instructions may be read into main memory 106 from another computer-readable medium, such as storage device 110. Execution of the sequences of instructions contained in main memory 106 causes processor 104 to perform the process steps described herein. In alternative embodiments, hard-wired circuitry may be used in place of or in combination with software instructions to implement the invention. Thus, embodiments of the invention are not limited to any specific combination of hardware circuitry and software.

The term "computer-readable medium" as used herein refers to any medium that participates in providing instructions to processor 104 for execution. Such a medium may take many forms, including but not limited to, non-volatile media, volatile media, and transmission media. Non-volatile media includes, for example, optical or magnetic disks, such as storage device 110. Volatile media includes dynamic memory, such as main memory 106. Transmission media includes coaxial cables, copper wire and fiber optics, including the wires that comprise bus 102. Transmission media can also take the form of acoustic or light waves, such as those generated during radio-wave and infra-red data communications.

Common forms of computer-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, and EPROM, a FLASH-EPROM, any other memory chip or cartridge, a carrier wave as described hereinafter, or any other medium from which a computer can read.

Various forms of computer readable media may be involved in carrying one or more sequences of one or more instructions to processor 104 for execution. For example, the instructions may initially be carried on a magnetic disk of a remote computer. The remote computer can load the instructions into its dynamic memory and send the instructions over a telephone line using a modem. A modem local to computer system 100 can receive the data on the telephone line and use an infra-red transmitter to convert the data to an infra-red signal. An infra-red detector coupled to bus 102 can receive the data carried in the infra-red signal and place the data on bus 102. Bus 102 carries the data to main memory 106, from which processor 104 retrieves and executes the instructions. The instructions received by main memory 106 may optionally be stored on storage device 110 either before or after execution by processor 104.

Computer system 100 also includes a communication interface 118 coupled to bus 102. Communication interface 118 provides a two-way data communication coupling to a network link 120 that is connected to a local network 122. For example, communication interface 118 may be an integrated services digital network (ISDN) card or a modem to provide a data communication connection to a corresponding type of telephone line. As another example, communication interface 118 may be a local area network (LAN) card to provide a data communication connection to a compatible LAN. Wireless links may also be implemented. In any such implementation, communication interface 118 sends and receives electrical, electromagnetic or optical signals that carry digital data streams representing various types of information.

Network link 120 typically provides data communication through one or more networks to other data devices. For example, network link 120 may provide a connection through local network 122 to a host computer 124 or to data equipment operated by an Internet Service Provider (ISP) 126. ISP 126 in turn provides data communication services through the world wide packet data communication network now commonly referred to as the "Internet" 128. Local network 122 and Internet 128 both use electrical, electromagnetic or optical signals that carry digital data streams. The signals through the various networks and the signals on network link 120 and through communication interface 118, which carry the digital data to and from computer system 100, are exemplary forms of carrier waves transporting the information.

Computer system 100 can send messages and receive data, including program code, through the network(s), network link 120 and communication interface 118. In the Internet example, a server 130 might transmit a requested code for an application program through Internet 128, ISP 126, local network 122 and communication interface 118.

The received code may be executed by processor 104 as it is received, and/or stored in storage device 110, or other non-volatile storage for later execution. In this manner, computer system 100 may obtain application code in the form of a carrier wave.

Functional Overview of Application Server

Figure 2:
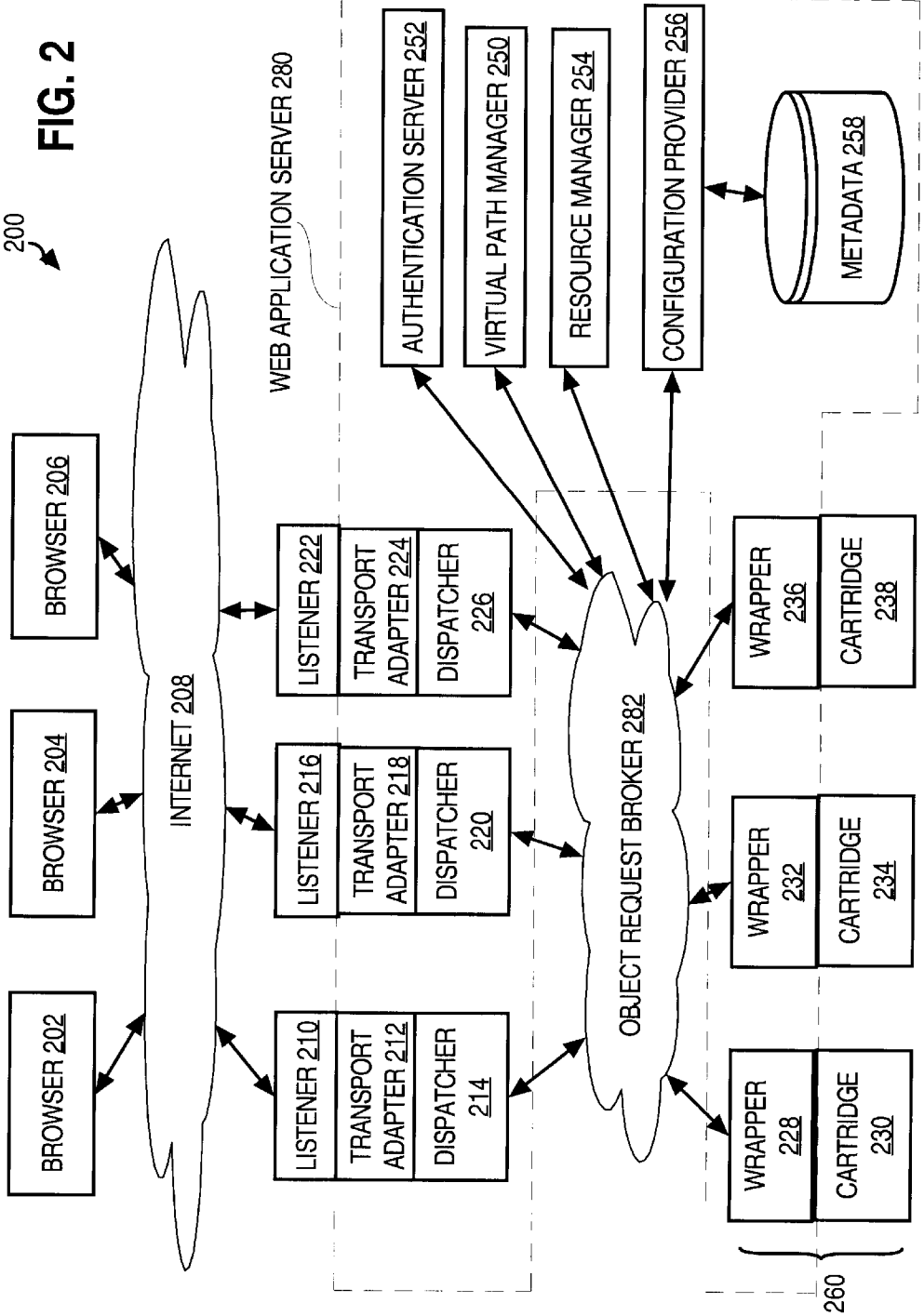
FIG. 2 is a block diagram of a distributed application server according to an embodiment of the invention.

FIG. 2 is a block diagram of a system 200 designed according to an embodiment of the invention. The system 200 includes a plurality of browsers 202, 204 and 206 that communicate with a plurality of listeners 210, 216 and 222 over the Internet 208 according to the HTTP protocol. In response to requests from the browsers, the listeners cause a web application server 280 to invoke software modules, referred to herein as cartridges. In the illustrated embodiment, web application server 280 has initiated the execution of three cartridges 230, 234 and 238.

The web application server 280 is composed of numerous components, including transport adapters 212, 218 and 224, dispatchers 214, 220 and 226, an authentication server 252, a virtual path manager 250, a resource manager 254, a configuration provider 256 and a plurality of cartridge execution engines 228, 232 and 236. The various components of the web application server 280 shall be described hereafter in greater detail.

Significantly, the numerous components of web application server 280 communicate through an inter-machine communication mechanism, such as an Object Request Broker 282. Using an inter-machine communication mechanism, cartridge instances that perform the operations specified in browser requests may execute on different machines than the listeners that receive the requests and the browsers that issue the requests. Because the cartridge instances are on different machines than the listeners, the listeners are better insulated against faulty cartridge instances, thus enhancing the reliability and security of the system. In addition, the scalability of the system is greatly increased by spreading the processing burden of executing the cartridge instances among many machines, rather than the same machine that is executing the listener. The ability to distribute cartridge instance execution across multiple machines allows numerous types of load balancing techniques to be used in deciding when and where to spawn new cartridge instances.

A typical operation within system 200 generally includes the following stages:

A browser transmits a request over the Internet 208.

A listener receives the request and passes it through a transport adapter to a dispatcher.

The dispatcher communicates with virtual path manager 250 to identify a cartridge selected by the browser request and to determine whether the cartridge requires authentication.

If the cartridge requires authentication, the dispatcher communicates with the authentication server 252 to determine whether the browser is authorized to access the selected cartridge.

If the authentication server 252 determines that the browser is not authorized to access the selected cartridge, the browser is notified that access has been denied.

However, if access is authorized or the virtual path manager 250 determines that authentication is not required, the dispatcher does one of two things. If the dispatcher knows about an unused instance for that cartridge, the dispatcher sends the request to that instance. If there are no unused cartridge instances for that cartridge, the dispatcher asks the resource manager 254 to create a new cartridge instance. After the instance starts up successfully, the cartridge notifies the resource manager of its existence. The resource manager 254 then notifies the dispatcher of the new instance. The dispatcher creates a revised request based on the browser request and sends the revised request to the new instance.

The cartridge instance handles the revised request and sends a response to the dispatcher.

The dispatcher passes the response back through the listener to the client.

These stages shall be described in greater detail hereafter.

Cartridges

Cartridges are modules of code for performing specific application or system functions. A cartridge forms the basic unit of distribution in the system 200. According to one embodiment of the invention, cartridges are named using Universal Resource Locators (URLs). Thus, a cartridge name (i.e. URL) has two parts: the IP address of the server on which the cartridge resides, and the virtual path in the server directory structure of the compiled cartridge code. Because cartridges are named using URLs, the cartridge name space is global and cartridges may be accessed using the same messaging techniques as are used to access other web resources, such as documents.

According to one embodiment of the invention, each cartridge has a standard interface which provides a common overall structure for all cartridges. The standard interface defines the interface of routines that are invoked by the web application server 280 under particular conditions. According to one embodiment of the invention, the abstract cartridge interface is as follows:

```
interface Cartridge
{
boolean init( );
boolean authenticate(in Principal user_passwd);
boolean exec(in Request req_obj, out Response resp_
  obj);
boolean shutdown( );
}
```

The init( ) routine is responsible for intializing the cartridge instance. This may include invoking the constructors of several subobjects, preforking threads and acquiring all other required shared resources.

The shutdown( ) routine is responsible for cleaning up all of the resources and shutting down the cartridge instance. Once the shutdown( ) routine is invoked on a cartridge instance, it immediately becomes unavailable for servicing subsequent requests.

The authenticate( ) routine validates whether the client requesting the services of the cartridge is authorized to use those services.

The exec( ) routine is the generic way to dispatch all service requests to the cartridge.

Exemplary Cartridges

Each cartridge is either configured as a cartridge that performs a well-defined function, or as a programmable cartridge that acts as an interpreter or a routine environment for an application. An example of a programmable cartridge is a PL/SQL runtime, configured to process database queries according to the Oracle-based Programming Language using Structured Query Language (PL/SQL). The PL/SQL runtime executes a browser request having a database query. The PL/SQL runtime processes the request, for example, by accessing a database server in communication with the cartridge instance via a data link.

Another example of a programmable cartridge is a JAVA runtime interpreter. The JAVA runtime interpreter cartridge enables web application developers to write server-side JAVA applications to process browser requests. Similarly, a custom server may be configured as a cartridge in order to provide dynamic operations such as, for example, accessing processes executed by a third party server.

Dispatchers

Dispatchers are software modules configured to route the requests received by listeners to the appropriate cartridges. According to one embodiment of the invention, dispatchers are implemented as server-side program extensions (i.e. "plug-ins"). As such, the dispatchers are loaded into and execute within the same address space as the listeners to which they belong. The dispatchers may be linked with the listener code at compile time or dynamically loaded at runtime.

In the illustrated embodiment, dispatchers 214, 220 and 226 are associated with listeners 210, 216 and 222, respectively. Dispatchers 214, 220 and 226 selectively route browser requests received by listeners 210, 216 and 222 to cartridges.

For example, assume that listener 210 receives a browser request over the Internet 208 delivered in the form of a Uniform Resource Locator (URL). The browser request serves as an identifier for a web object, for example an HTML page or an operation to be performed. The listener 210 hands off the browser request to dispatcher 214 without any attempt at interpreting the browser request. Upon receiving the browser request, the dispatcher 214:

(1) communicates with virtual path manager 250 to identify a cartridge selected by the browser request and to determine whether the cartridge requires authentication, (2) if the cartridge requires authentication, communicates with the authentication server 252 to determine whether the browser is allowed to access the selected cartridge, (3) if access is authorized, communicates with the resource manager to determine the specific instance of the selected cartridge to which the browser request should be sent, and (4) creates and dispatches a revised browser request for execution by the specified instance of the cartridge.

The revised browser request repackages information received in the original browser request. The revised browser request may include, for example, a context object that contains data required for the proper operation of the cartridge. The data required for proper operation of a cartridge may include, for example, a transaction ID that identifies a transaction with which the browser request is associated.

If the cartridge replies to the request, the cartridge sends the reply to the dispatcher and the dispatcher passes the reply up to the listener for transmission to the browser that initiated the request.

Configuration Provider

According to one embodiment of the invention, cartridges that are to be used with web application server 280 are first registered with web application server 280. During the registration process, information about the cartridges is supplied to the configuration provider 256. Configuration provider 256 stores the information as metadata 258 for later access by the components of the web application server 280.

The metadata 258 may include, for example, (1) the cartridge name;

(2) the minimum number of required instances;

(3) the maximum number of instances;

(4) the location of the code that implements the cartridge;

(5) the program-dependent function names used by the cartridge execution engine to execute the callback functions (initialization, request handler, shutdown);

(6) a list of machines for running the cartridge;

(7) the idle time for the cartridge (the amount of time instances of the cartridge are allowed to remain idle before they are shut down);

(8) an object identifier; and (9) data indicating the type of authentication service, if any, to be used with the cartridge.

The object identifier specifies the data that must be supplied by a browser request for requesting performance of an operation by the corresponding cartridge. The object type may be a specific word, a URL, or may include a virtual path such as "/java".

Once the configuration provider 256 has stored the configuration information for a particular cartridge in the metadata 258, that cartridge is automatically registered when web application server 280 is started.

After a cartridge is registered with the web application server 280, the resource manager 254 initiates the minimum instances for the cartridge. Once the minimum number of instances has been initiated, the web application server 280 is prepared to process browser requests.

The Virtual Path Manager

As mentioned above, dispatchers communicate with the virtual path manager 250 to determine where to route each revised browser request. Specifically, each browser request typically includes a URL. Upon receiving a browser request, the dispatcher sends the URL in the request to the virtual path manager 250. The virtual path manager 250 responds by sending the dispatcher data that identifies the cartridge, if any, associated with the URL.

In order to supply the required information to dispatchers, virtual path manager 250 consults the metadata 258 that maps URLs to cartridges. In response to receiving a browser request, the virtual path manager 250 uses the mapping data to determine the cartridge, if any, to which the URL contained in the browser requests corresponds.

For example, if the browser request is a URL request beginning with the virtual path "/java", the mapping may indicate that the JAVA interpreter cartridge is configured to handle requests having the virtual path "/java".

According to one embodiment of the invention, the virtual path manager 250 also determines whether the cartridge associated with the URL requires authentication. If the cartridge requires authentication, the virtual path manager 250 indicates in the response that the virtual path manager 250 sends to the dispatcher that authentication is required. If authentication is not required, the dispatcher creates and sends a revised browser request to an instance of the cartridge without invoking the authentication server 252. If authentication is required, the dispatcher sends the revised request to an instance of the cartridge only after the authentication server indicates that the revised request may be submitted to an instance of the cartridge.

The Resource Manager

The resource manager 254 of the web application server 280 manages the execution of each of the cartridges by initiating a predetermined minimum number of instances for the cartridges, load balancing between the instances of each cartridge, and initiating new instances of cartridges as necessary up to a predetermined maximum number of instances of a given cartridge.

For example, assume that the metadata for a particular cartridge (C1) includes the following information:

Name=C1

Minimum Instances=10

Maximum Instances=50

Host Machines=M1, M2, M3

Idle time=30 seconds

Based on this metadata, when cartridge C1 is first registered, resource manager 254 will initiate ten instances of C1. Resource manager 254 will initiate the ten instances on the machines associated with the labels M1, M2 and M3.

Upon receipt of requests from dispatchers to access C1, resource manager 254 determines whether any existing instance of C1 is available for use. If no instance of C1 is available when a request is received, resource manager 254 determines whether the maximum number of instances of C1 are already running. If the maximum number of instances of C1 are not already running, then resource manager 254 initiates a new instance of C1 on one of the possible host machines and transmits a message that identifies the new instance to the dispatcher that issued the request. If the maximum number of instances of C1 are already running, then resource manager 254 sends a message to the dispatcher that issued the request to indicate that the request cannot be handled at this time.

Load Balancing

According to one embodiment of the invention, resource manager 254 applies a set of load balancing rules to determine where to initiate instances of cartridges where there is more than one possible host machine. Thus, in the above example, M1, M2 and M3 are all capable of executing instances of cartridge C1. If M1, M2 and M3 have the same processing capacity, it may be desirable to distribute the instances evenly across the three machines. However, if M1 has ten times the processing power of M2 and M3, it may be desirable to initiate all instances of C1 on M1 up to a certain point, and then to distribute additional instances evenly among M1, M2 and M3.

To assist resource manager 254 in determining how to load balance among possible machines, the metadata stored for each cartridge may include additional details. For example, the metadata may specify a separate minimum and maximum number of instances for each machine. Resource manager 254 may then distribute new instances among the machines based on which machine has the lowest ratio of actual instances to maximum instances.

The metadata may also specify an order for the machines that can run a cartridge. The machine at the N+1 position in the order is only used to execute instances of the cartridge when the machine at the Nth position in the order is already executing its maximum number of instances.

Cartridge Instance Status Tracking

According to one embodiment of the invention, the resource manager 254 maintains state information to keep track of cartridge instances that have been created. The state information includes data that identifies the instance, identifies the machine executing the instance, and identifies the listener to which the instance has been assigned.

FIG. 5 illustrates a table 500 that may be maintained by resource manager 254 to store this state information. Table 500 includes an instance column 502, a cartridge column 504, a listener column 506 and a machine column 508. Each row of table 500 corresponds to a distinct cartridge instance. Within the row for a given cartridge instance, cartridge column 504 identifies the cartridge associated with the cartridge instance and instance column 502 indicates the instance number of the cartridge instance. For example, row 510 corresponds to an instance of cartridge C1. Therefore, cartridge column 504 of row 510 indicates cartridge C1. Instance column 502 of row 510 indicates that the cartridge instance associated with row 510 is instance 1 of cartridge C1.

Listener column 506 indicates the listener to which the cartridge instance associated with a row has been assigned. Machine column 508 indicates the machine on which the cartridge instance associated with a row is executing. For example, the cartridge instance associated with row 510 has been assigned to listener 210 and is executing on machine M1.

Similar to resource manager 254, each dispatcher maintains state information for the cartridge instances that have been assigned to the listener to which the dispatcher is attached. Such state information may be maintained, for example, in a table 400 as shown in FIG. 4. Similar to table 500, table 400 includes an instance column 402 and a cartridge column 404 that respectively hold instance numbers and cartridge identifiers. However, while table 500 includes one entry for every cartridge instance assigned by resource manager 254, table 400 only includes entries for cartridge instances that have been assigned to a particular listener. For example, table 400 includes entries for only those cartridge instances listed in table 500 that have been assigned to listener 210.

In addition to instance column 402 and cartridge column 404, table 400 includes a status column 406. For each row, the status column 406 holds a value that indicates the status of the instance associated with the row. For example, the status column 406 of row 408 indicates that instance 1 of cartridge C1 is currently busy. In the illustrated embodiment, the status column 406 holds a flag that indicates that a cartridge instance is either BUSY or FREE. The significance of the cartridge status shall now be describe with reference to the operation of resource manager 254 and dispatchers 214 and 220.

Interaction Between Dispatches and The Resource Manager

As explained above, dispatchers communicate with resource manager 254 when they need to send a revised browser request to a particular cartridge. According to one embodiment of the invention, dispatchers first determine whether an instance of the appropriate cartridge (1) has already been assigned to it and (2) is available to process the new revised browser request. If an appropriate cartridge instance has already been assigned to the dispatcher and is currently available to process the new revised browser request, then the dispatcher forwards the revised browser request to the cartridge instance without further communication with resource manager 254.

For example, assume that listener 210 receives a browser request that, according to virtual path manager 250, must be processed by cartridge C1. Assume also that table 400 reflects the current list and status of cartridge instances that have been assigned to listener 210. Upon receiving the browser request from listener 210, dispatcher 214 inspects table 400 to locate a FREE instance of cartridge C1. In the illustrated table 400, row 410 indicates that instance 3 of cartridge C1 is currently FREE. Consequently, dispatcher 214 forwards a revised browser request directly to instance 3 of cartridge C1 without further communication with resource manager 254. In response to sending the revised browser request, dispatcher 214 changes the status value in status column 406 of row 410 to BUSY.

If a listener has not already been assigned an appropriate cartridge instance that is currently available, then the dispatcher associated with the cartridge requests a cartridge instance from the resource manager 254. If the resource manager 254 determines that an instance of the required cartridge is not available and the number of existing instances of the required cartridge is below the maximum, then the resource manager 254 initiates a new cartridge. Upon initiating a new cartridge, the resource manager 254 inserts an entry for the new cartridge instance in table 500.

Assume, for example, that listener 210 receives a browser request that must be processed by cartridge C3. Assume also that instance 3 of cartridge C3 has not yet been initiated. Under these conditions, dispatcher 214 sends to resource manager 254 a request for a handle to an instance of cartridge C3. In response to this request, resource manager 254 initiates instance 3 of cartridge C3 on machine M3. In addition, resource manager 254 inserts into table 500 the entry found at row 512.

After inserting row 512 for instance 3 of cartridge C3 in table 500, resource manager 254 sends back to the dispatcher 214 a handle to the newly created instance. In response to receiving this handle, dispatcher 214 inserts an entry (row 412) for the new instance in its status table 400. The dispatcher 214 then transmits a revised browser request to instance 3 of cartridge C3.

Releasing Cartridge Instances

According to one embodiment of the invention, listeners do not automatically release ownership of cartridge instances when the cartridge instances finish responding to outstanding browser requests. For example, assume that instance 3 of cartridge C3 receives a revised browser request, processes the revised browser request, and sends a response back to dispatcher 214. Dispatcher 214 passes the response to listener 210 to be sent back to the browser that issued the browser request.

At this point, listener 210 no longer requires ownership of instance 3 of cartridge C3. However, rather than transferring ownership of instance 3 of cartridge C3 back to resource manager 254, dispatcher 214 merely changes the status column 406 of row 412 from BUSY to FREE.

Changing the value in status column 406 of row 412 to FREE indicates that instance 3 of cartridge C3 is no longer working on a request, and is therefore ready to handle subsequent requests. However, because table 400, which indicates that instance 3 of cartridge C3 is available, is maintained locally by dispatcher 214, instance 3 of cartridge C3 is only available for subsequent browser requests arriving at listener 210. Row 512 of table 500 maintained by resource manager 254 continues to indicate that instance 3 of cartridge C3 is owned by listener 210.

Because listeners do not automatically release cartridge instances every time a request is serviced, overhead associated with communication between the resource manager 254 and the various dispatchers is significantly reduced. For example, assume that a listener 210 receives ten successive requests that must be communicated to cartridge C3. Rather than communicating with resource manager 254 for each of the ten requests, dispatcher 214 may communicate with resource manager 254 in response to the first request. The subsequent nine requests can be handled by dispatcher 214 without communicating with resource manager 254 because the dispatcher 214 uses the same instance of C3 that processes the first request to process the nine subsequent requests.

While not automatically releasing listener ownership of cartridge instances when each request is serviced can increase the efficiency of web application server 280, listeners cannot maintain ownership of cartridge instances indefinitely. For example, instances that have not been used for long periods of time should be passed back to the resource manager 254 so they can be de-allocated to free up resources. In addition, it is not efficient for one listener to maintain ownership of the instance of a cartridge that it has not used for a relatively long time when other listeners require instances of that cartridge.

Consequently, resource manager 254 communicates to each listener a maximum idle time for each cartridge instance passed to the listener. The maximum idle time indicates the maximum amount of time a cartridge instance can go unused before the listener must release ownership of the cartridge instance. For example, assume that the resource manager 254 indicates to listener 210 that the maximum amount of idle time for instance 3 of cartridge C3 is 10 minutes. Based on this information, listener 210 may continue to use instance 3 of cartridge C3 to process browser requests for cartridge C3 as long as instance 3 of cartridge C3 does not remain idle or FREE for more than 10 minutes.

If instance 3 of cartridge, C3 is idle for more than 10 minutes, dispatcher 214 removes row 412 from table 400 and sends a message to resource manager 254 that listener 210 is releasing ownership of instance 3 of cartridge C3. In response to this message, resource manager 254 updates row 512 to indicate that instance 3 of cartridge C3 is not owned by any listener and may thus be reassigned to another listener or terminated.

In an alternative embodiment, dispatchers do not automatically release cartridge instances when the idle time for the cartridge instance has expired. Instead, the dispatcher sends a message to resource manager 254 offering to release the expired instance. Resource manager 254 may respond to the offer by requesting that the listener release the cartridge instance, or by allowing the listener to retain ownership of the expired cartridge instance.

According to one embodiment of the invention, resource manager 254 maintains a queue of the requests that cannot be immediately serviced. When it becomes possible to service a queued request, the request is removed from the queue and processed.

For example, assume that listener 222 receives a browser request that must be processed by cartridge C1, and that listener 222 has not been assigned any instances of cartridge C1. Dispatcher 226 sends a request for an instance of C1 to resource manager 254. Assume further that a maximum of 50 instances of C1 are allowed, and that 50 instances of C1 have been assigned to listener 210. Under these conditions, resource manager 254 cannot service the request from listener 222. Therefore, resource manager 254 puts the request on a queue. When listener 210 releases an instance of C1, resource manager 254 communicates to listener 222 that an instance of C1 is available.

Under certain conditions, resource manager 254 may preemptively cause a listener to release a cartridge instance. For example, resource manager 254 may detect a system overload situation and respond by terminating a set of cartridge instances, either before or after informing the listeners that currently have been assigned the cartridge instances that the cartridge instances are going to be terminated.

Resource manager 254 may also preemptively cause listeners to release cartridge instances to implement fairness policies between listeners. For example, resource manager 254 may cause a listener that holds the most instances of a given cartridge to release an instance of the cartridge when another listener has waited more than a predetermined threshold of amount of time for an instance of the cartridge. For example, if listener 210 has been assigned 50 instances of cartridge C1 and C1 has a maximum of 50 instances, then resource manager 254 may cause listener 210 to release an instance of C1 ten seconds after receiving a request for an instance of C1 from another listener.

Cartridge Executive Engines

According to one embodiment of the invention, each cartridge instance is composed of a cartridge execution engine and a cartridge. A cartridge execution engine is a code module that insulates cartridges from the complexities of the web application server 280 and the inter-module communication mechanism. A cartridge is made available to a cartridge execution engine by storing in a function table pointers to the cartridge functions. According to one embodiment, all cartridges provide the functions specified in the exemplary cartridge interface described above. By having all cartridges support the same interface, a single standard cartridge execution engine can be used with all cartridges.

According to one embodiment of the invention, cartridges are implemented as shared libraries, and cartridge execution engines are executable programs that invoke the routines in the shared libraries using the standard cartridge interface. The cartridge execution engine provides the interface between cartridges and the dispatcher, directs cartridge flow of control, and provides services for cartridges to use.

When the resource manager 254 requires the creation of a new cartridge instance, the resource manager 254 causes a cartridge execution engine to be instantiated. In turn, the instance of the cartridge execution engine thus created causes the appropriate cartridge to be instantiated. The resource manager 254 can cause the cartridge execution engine to be instantiated, for example, by invoking a "cartridge execution engine factory" that resides on the machine on which the cartridge is to be executed. The instance of the cartridge execution engine can cause the cartridge to be instantiated, for example, by making a call to one of the routines in the shared library that constitutes the cartridge.

As shown in FIG. 2, the web application server 280 includes cartridge execution engines 228, 232 and 236 for each of the cartridges 230, 234 and 238. The cartridge execution engines control execution of the instances of the corresponding cartridges by making calls into the cartridges through the standard cartridge interface. By establishing basic callback functions between the cartridge execution engine and a cartridge, any cartridge can be integrated into the web application server 280 by configuring the cartridge to respond to the callback functions, and then registering the cartridge in the configuration provider 256, as described below.

Thus, if the dispatcher 214 determines that the PL/SQL runtime cartridge is the appropriate cartridge to process a request, the dispatcher,214 dispatches the request to a cartridge instance that includes a cartridge execution engine associated with the PL/SQL runtime cartridge. If a new instance needs to be initiated, the resource manager 254 creates a new instance of the PL/SQL runtime cartridge in a separate address space and dispatches the request to the cartridge execution engine 228 of the new instance. The address space used to execute the instance of the program may be within memory of the computer system upon which one or more of the components of web application server 280 is executing, or on another computer system.

In response to a message from a dispatcher, the cartridge execution engine issues a request handler callback function to the cartridge, causing the cartridge to process the request. The cartridge executing the request returns the result to the cartridge execution engine, which forwards the result to the dispatcher. In the event that the web application server 280 detects a fault in the operation, the cartridge execution engine issues a shutdown function of the cartridge.

Hence, the cartridge execution engine provides an application programming interface to the web application server 280 that specifies predetermined operations to be performed. Use of the standard cartridge interface enables programmers of the cartridges to configure each cartridge for high-level integration into the web application server 280 independent of the protocols used by the particular web listener with which the cartridge will be used.

Transport Adapters

Listeners enable the use of server-side plug-ins by providing a programming interface and protocol for use by such plug-ins. Unfortunately, the programming interfaces and protocols provided by listeners vary from listener to listener. For example, Netscape Server Application Programming Interface (NSAPI), Internet Server Application Programming Interface (ISAPI) and Application Development Interface (ADI) are three examples of distinct programming interfaces currently provided by listeners.

Transport adapters insulate dispatchers from the proprietary protocols and interfaces used by web listeners. Specifically, each transport adapter is configured to recognize the protocols of different listeners, and to convert the browser requests received from the listeners into converted browser requests having a standard dispatcher protocol that is independent from the protocol of the listener. Similarly, transport adapters convert the replies from the dispatcher to the transport protocol of the listeners.

Hence, the transport adapter enables the web application server 280 to be used with listeners from different vendors. Moreover, transport adapters may be configured to accommodate different server architectures and operating systems.

Operation of the Web Application Server

Figure 3A:
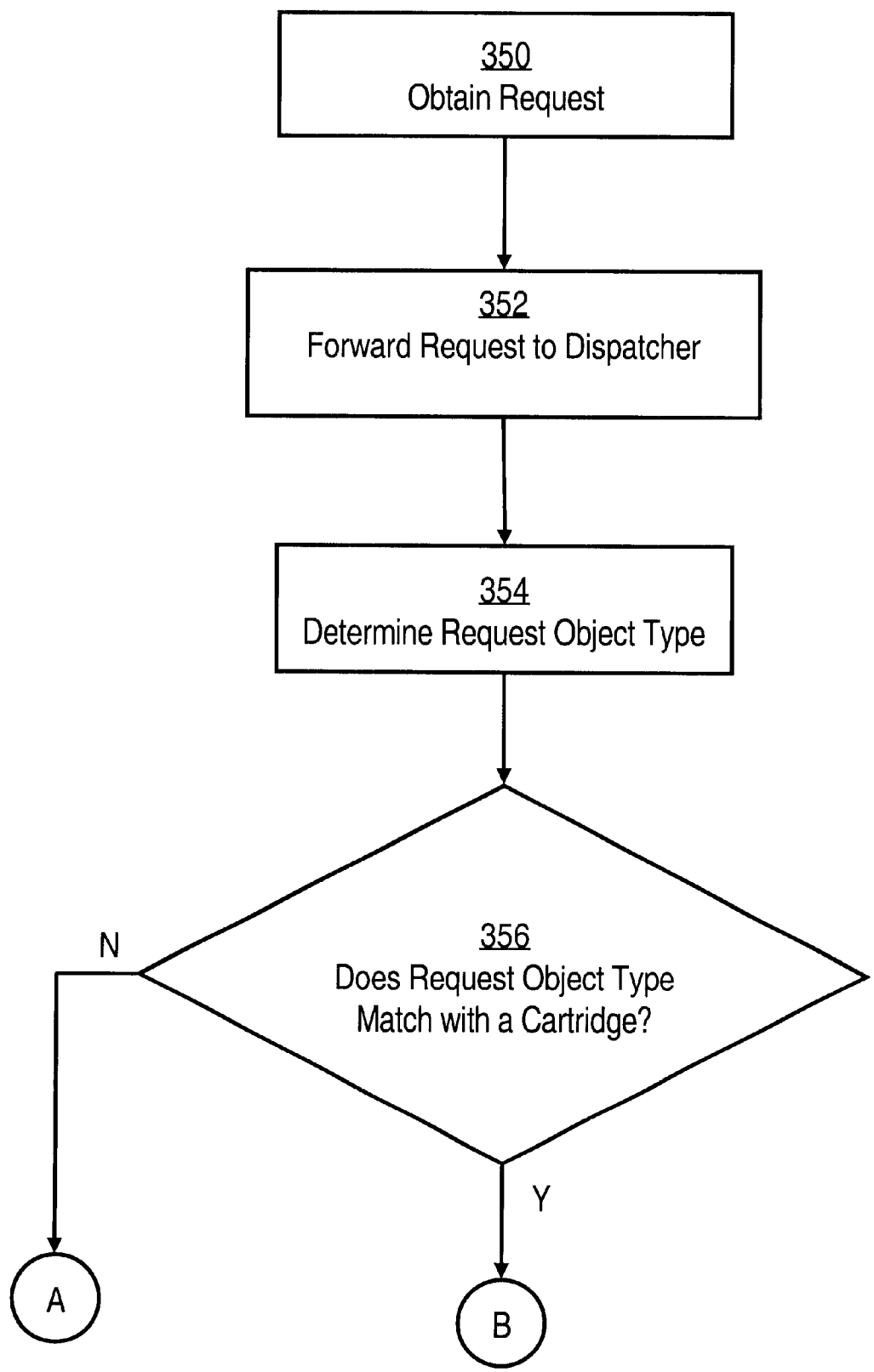
FIG. 3A is a portion of a flow chart illustrating steps for handling a browser request according to an embodiment of the invention.
Figure 3B:
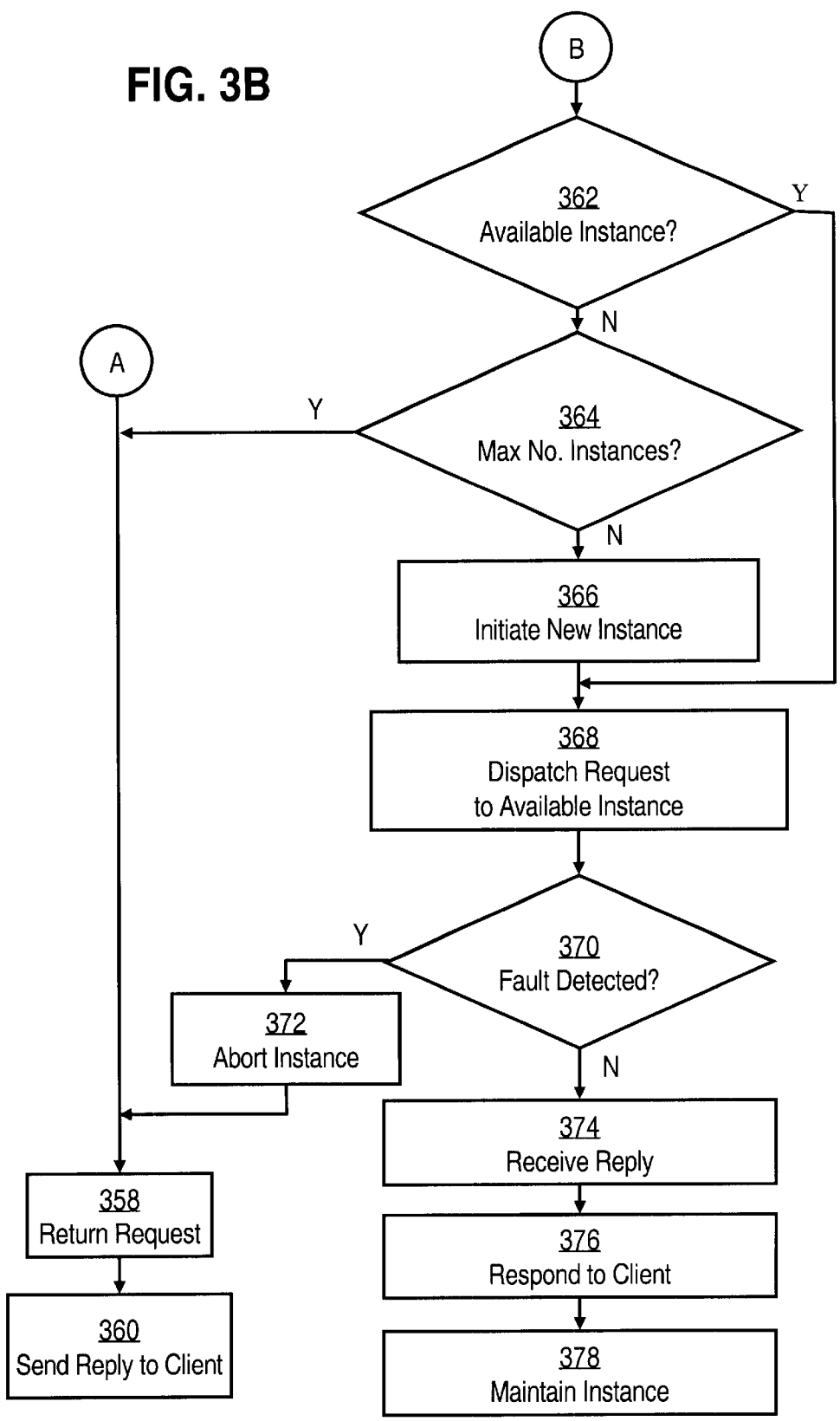
FIG. 3B is another portion of the flow chart illustrating steps for handling a browser request according to an embodiment of the invention.

FIGS. 3A and 3B are a flow diagram illustrating a method of responding to a browser request according to an embodiment of the present invention. The browser request is received in step 350 by a listener. For the purposes of explanation, it shall be assumed that the browser request was issued by browser 202 and received by listener 210.

Upon receiving the browser request, the listener 210 forwards the request to the web application server 280 in step 352. Specifically, listener 210 passes the request to the transport adapter 212 using the proprietary programming interface of the listener 210. The transport adapter 212 converts the request as necessary to pass the request to dispatcher 214 using a standard dispatcher programming interface.

Dispatcher 214 identifies the request object type that corresponds to the browser request in step 354 based on the virtual path specified in the browser request by communicating with the virtual path manager 250. If the request object type corresponds to a cartridge, the virtual path manager also indicates to the dispatcher 214 whether authentication is required.

The dispatcher 214 determines in step 356 if the request object type corresponds to an identifiable cartridge. If the request object type does not correspond to an identifiable cartridge, the request is returned to the listener 210 in step 358 (see FIG. 3B). If in step 358 the listener 210 recognizes the request as a request for a static HTML page, the listener accesses the static HTML page, and sends the HTML page to the browser 202 in step 360. If the browser request is not recognized by the listener 210, the reply is sent to the browser 202 in step 360 indicating that the request was unrecognizable.

If in step 356 the dispatcher 214 determines that the request must be sent to a cartridge, then the dispatcher performs any necessary authentication by communicating with the authentication server 252. The authentication process will be described in greater detail hereafter. In addition, if in step 356 it is determined that listener 210 has not been assigned any instances of that cartridge that are currently FREE, then the dispatcher 214 communicates with the resource manager 254 to be assigned an instance of the cartridge 230 to which the browser request can be sent.

In step 362, shown in FIG. 3B, the resource manager 254 determines whether an instance of the identified cartridge is available (unowned) among the existing number of instances. For the purposes of explanation, it shall be assumed that the request is associated with cartridge 230, and that cartridge 230 is a PL/SQL runtime cartridge.

If in step 362 the resource manager identifies an available instance, for example instance 260 of the PL/SQL runtime 230, the resource manager 254 informs the dispatcher 214 that the request should be sent to instance 260. The dispatcher 214 then creates and sends a revised browser request to the cartridge execution engine 228 of the instance 260 in step 368 to cause the available instance 260 to process the request, as described below.

However, if in step 362 no instance of the cartridge 230 is available, the resource manager 254 determines in step 364 if the existing number of instances exceeds a maximum prescribed number. If the existing number of instances exceeds the maximum prescribed number in step 364, the resource manager 254 indicates to the dispatcher 214 that the request cannot be processed at this time. In response, the dispatcher 214 returns the request to the listener 210 in step 358, after which the web listener 210 sends a reply to the browser 202 over the network in step 360 indicating the request was not processed.

Alternatively, when a cartridge instance is not currently available to handle a request, listener 210 may place the request on a waiting list for that cartridge instance. When a cartridge instance becomes available, the revised browser request is removed from the waiting list and forwarded to the cartridge instance. If the revised browser request remains on the waiting list for more than a predetermined amount of time, listener 210 may remove the request from the waiting list and send a message to the browser 202 to indicate that the request could not be processed.

If in step 364 the existing number of instances does not exceed the maximum prescribed number, the resource manager 254 initiates a new instance of the identified program and informs the dispatcher 214 that a revised browser request based on the browser request should be sent to the new instance. The dispatcher 214 then dispatches a revised browser request to the cartridge execution engine of the new instance.

For example, assume that the resource manager 254 initiated instance 260 in response to the browser request. During the initialization, the stored sequences of instructions for the PL/SQL runtime are accessed to create a new instance 260 of the cartridge 230 in an address space that is separate from the address space in which dispatcher 214 is executing. According to one embodiment, initialization is performed by loading the cartridge execution engine 228 and having the cartridge execution engine call the initialization routine in cartridge 230.

Once the new instance 260 is running, the dispatcher 214 dispatches the request to the cartridge execution engine 228 associated with the new instance 260 in step 368. The cartridge execution engine 228 sends a callback message to the new instance 260 requesting execution of the request. In the callback message, the cartridge execution engine 228 passes any parameters necessary for the instance 260 to process the request. Such parameters may include, for example, passwords, database search keys, or any other argument for a dynamic operation executed by the instance 260.

The instance 260 then executes the request. During the execution of the request by the instance in step 368, the dispatcher 214 monitors the instance to determine the occurrence of a fault in step 370. If in step 370 the dispatcher 214 detects a fault, the dispatcher 214 calls the corresponding cartridge execution engine 228 in step 372 to abort the instance 260 having the fault. The corresponding cartridge execution engine 228 in turn issues a shut down command across the API to the faulty instance. The instance, responding to the shut down command by the cartridge execution engine 228, will shut down without affecting any other process in any other address space.

If in step 370 no fault is detected, the dispatcher 214 receives a reply from the instance 260 upon completion of execution in step 374. The dispatcher 214 in step 376 forwards the reply to the listener 210, which responds to the browser with the reply from the executed instance 260. After executing the instance 260, the dispatcher 214 in step 378 maintains the instance in the memory, as shown in step 378 to enable execution of a subsequent request.

Distributed Architecture of Web Server

Significantly, the various components of the web application server 280 communicate with each other using a communication mechanism that does not require the components to be executing in the same address space or even on the same machine. In the illustrated embodiment, the components of the web application server 280 are configured to communicate through an Object Request Broker (ORB) 282. Object Request Brokers are described in detail in "Common Object Request Broker: Architecture and Specification (CORBA)". This and other documents relating to CORBA can be found on the World Wide Web at http://www.omg.org.

While the embodiments of the present invention shall be described with reference to communications through a CORBA-compliant ORB, other cross-platform communication mechanisms may be used. For example, the components of web application server 280 may alternatively communicate with each other using Remote Procedure Calls (RPC), a UNIX pipe, Microsoft COM.

Because the various components of the web application server 280 communicate with each other using a machine independent communication mechanism, there are no inherent restrictions with respect to where the components are located with respect to each other. For example, listeners 210, 216 and 222 may be executing on the same machine, or on three completely different machines, each with a different operating system. Similarly, the authentication server 252, virtual path manager 250, resource manager 254 and configuration provider 256 may be executing on the same machine or on four different machines. Further, those four different machines may not have any overlap with the three machines executing listeners 210, 216 and 222.

Cartridge execution engines 228, 232 and 236 incorporate all of the necessary logic to communicate with the other components of the web application server 280 through the object request broker 282. Consequently, the location of the cartridge instances themselves is not inherently restricted by the communication mechanism. Thus, instance 260 may be executing in a completely different machine and operating system than dispatchers from which it receives requests. Likewise, instance 260 may be on a different machine and operating system than the resource manager 254 or any of the other components of the web application server 280, including instances of other cartridges that are being managed by the same web application server 280.

Significantly, the location-independence enjoyed by cartridges used by web application server 280 is achieved through the cartridge execution engine communication logic, not through any custom programming in the cartridges themselves. Consequently, the cartridges do not need to be specially designed for execution in a distributed application server environment. Cartridge designers are thus insulated from the complexities of a distributed system, and can concentrate their efforts on the logic associated with the tasks for which the cartridges were created.

Authentication Functional Overview

As previously mentioned, each browser message is associated with URL information that, among other things, identifies a particular cartridge that is to be accessed. Upon receiving a browser request, the dispatcher communicates with the virtual path manager to determine whether the cartridge associated with the browser message requires authentication. If the cartridge does not require authentication, the dispatcher dispatches the browser request for execution by the cartridge. However, if the cartridge requires authentication, the dispatcher sends an authentication request to the authentication server.

Using the information contained in the authentication request the authentication server determines whether the browser request is authorized to access the cartridge. If the browser request is authorized to access the cartridge, the dispatcher dispatches the browser request for execution by the cartridge. If, on the other hand, the browser request is not authorized to access the cartridge, the dispatcher sends a message to the browser indicating that access was denied. This process is repeated for each browser request.

FIG. 6 is a block diagram of a system 600 that provides for an extensible authentication mechanism in a stateless web environment according to one embodiment of the invention. FIG. 6 is similar to FIG. 2 and therefore like components have been numbered alike.

The system 600 includes an authentication server 252 that is connected to multiple dispatchers 214, 220 and 226 through object request broker 282. Authentication server 252 comprises an authentication engine 602, an authentication host 604 and a plurality of authentication service providers (simply referred to as providers) 606, 608, 610 and 612.

Authentication engine 602 communicates with dispatchers 214, 220 and 226 through object request broker 282 to receive authentication requests. Upon receiving an authentication request, the authentication engine 602 parses the authentication request into one or more provider requests. The authentication engine 602 then sends the provider requests through the object request broker 282 to the authentication host 604 for distribution to the appropriate provider.

When the authentication host 604 receives a provider request from the authentication engine 602, it forwards the provider request to the appropriate provider. Upon receiving a provider request, the provider determines whether access should be authorized based on the information contained in the provider request. The provider then sends a response message back up to the authentication engine 602 via the authentication host 604 and the object request broker 282. The response message indicates whether access should be authorized based on the information contained in that particular provider request.

The authentication engine 602 then uses the one or more provider response messages to determine if cartridge access should be authorized based on the authentication request that was received from the dispatcher. The authentication engine then notifies the dispatcher whether the browser request should be forwarded to the appropriate cartridge or that the sending browser should be notified that access was denied.

Protect Strings

As previously indicated, cartridges that are to be used with web application server 280 are first registered by providing information to the configuration provider 256 to be stored as metadata. During the registration process, each cartridge supplies a list of URLs that are to be associated with the particular cartridge. The URLs are used to identify the cartridge that is associated with a particular browser request. In order to restrict the access to a particular cartridge, an optional protect string may be associated with each URL entry.

In one embodiment of the invention, each protect string is comprised of one or more scheme name/realm name pairs, with multiple scheme name/realm name pairs being separated by a logical function (e.g. AND, OR). The scheme name identifies a provider type that is to be used for authenticating cartridge access. The realm name describes the type of authentication information that is required by the provider that is associated with the scheme name.

For example, when cartridge 238 registers, it may be associated with a URL and a protection string as follows:

URL1 CARTRIDGE_238 BASIC(GROUP1) AND IP(IP_LIST).

In this example URL1 represents a URL and the scheme names "BASIC" and "IP" identify the providers that are to be used for cartridge access authentication. Realm names "GROUP1" and "IP_LIST" are associated with scheme names "BASIC" and "IP" respectively and describe the type of authentication information that is required by each provider type. The logical "AND" operation is used by the authentication engine and indicates that the response messages received from the "BASIC" and "IP" providers must be logically "ANDED" to determine whether the browser request is authorized to access CARTRIDGE_238.

Providers

Providers are modules of code that are used to perform specific types of authentication. According to one embodiment of the invention, providers are implemented as dynamically linked libraries (DLLs). As such, the providers are loaded into and execute within the same address space as the authentication hosts to which they belong. The providers are preferably loaded dynamically at runtime.

Each provider contains a table of function pointers and a properties list. The function pointer table provides pointers to particular provider functions that may be accessed by the authentication host 604. The property list describes the type of authentication information (such as the identity of the user initiating the request for a cartridge) that are required for accessing the particular provider. According to one embodiment, the property tables include the name of the provider, the location where its DLL is stored on disk and an entry point address. An authentication host can call the entry point to obtain a list of function pointers that can be used in authenticating a particular provider request.

In one embodiment, the information associated with a particular provider is stored in web application server 280 as metadata at the time the provider is initialized. By storing provider information as metadata when a provider is initialized, a mechanism is provided that allows providers to be dynamically added and removed from the authentication server 252.

As illustrated in FIG. 6, providers 606, 608, 610 and 612 are associated with authentication host 604. Each provider provides a specific authentication function to restrict access to a particular cartridge. For example, a BASIC provider may be associated with the authentication host and used to restrict cartridge access to only those browser requests that are associated with a particular username and password pair. Thus, when the BASIC provider receives a provider request from the authentication host, the BASIC provider searches a predefined username/password access list to determine if access should be provided. If the BASIC provider finds a username/password match, the BASIC provider sends a message to the authentication host indicating that access should be allowed based on the supplied username and password pair. However, if the BASIC provider does not find a match, the BASIC provider sends a message to the authentication host indicating that access should not be allowed based on the username/password pair.

Another example of a type of provider that may be associated with authentication host is an IP address provider. The IP address provider can be used to restrict cartridge access to only those browser requests that are associated with a particular IP address. Thus, when the IP address provider receives a provider request from the authentication host, the IP address provider searches a predefined IP access list to determine if access should be provided. If the IP address provider finds an IP address match, the IP address provider sends a message to the authentication host indicating that access should be allowed based on the supplied IP address. However, if the IP address provider does not find a match, the IP address provider sends a message to the authentication host indicating that access should not be allowed based on the IP address.

Another example of a type of provider that may be associated with an authentication host is a DOMAIN name provider. The DOMAIN name provider can be used to restrict cartridge access to only those browser requests that are associated with a particular domain name. Thus, when the DOMAIN name provider receives a provider request from the authentication host, the DOMAIN name provider searches a predefined DOMAIN name list to determine if access should be provided. If the DOMAIN name provider finds a DOMAIN name match, the DOMAIN name provider sends a message to the authentication host indicating that access should be allowed based on the supplied DOMAIN name. However, if the DOMAIN name provider does not find a match, the DOMAIN name provider sends a message to the authentication host indicating that access should not be allowed based on the DOMAIN name.

Another example of a type of provider that may be associated with an authentication host is a DATABASE provider. The DATABASE provider can be used to restrict cartridge access to only those browser requests that are associated with a particular username and password pair contained within a particular database. Thus, when the DATABASE provider receives a provider request from the authentication host, the DATABASE provider searches the database to determine if access should be provided. If the DATABASE provider finds a username/password match in the database, the DATABASE provider sends a message to the authentication host indicating that access should be allowed based on the supplied database username and password pair. However, if the DATABASE provider does not find a match, the DATABASE provider sends a message to the authentication host indicating that access should not be allowed based on the database username/password pair.

Another example of a type of provider that may be associated with an authentication host is a DIGEST provider. The DIGEST provider can be used to restrict cartridge access to only those browser requests that are associated with a particular username and encrypted password pair. When the DIGEST provider receives a provider request from the authentication host, the DIGEST provider generates a random number that is sent back to the browser associated with the browser request via the dispatcher.

When the browser receives the random number it encrypts a password based on the random number generated by the DIGEST provider and sends it back to the authentication engine via the dispatcher and object request broker. The authentication engine then passes the encrypted password back to the Digest provider via the object request broker and the authentication host. When the DIGEST provider receives the encrypted password sent from the browser it compares it with an encrypted password generated by the DIGEST provider. The Digest provider then uses the result of the comparison to determine whether the browser request should have access to the cartridge.

Authentication Engine

According to one embodiment, when the authentication engine 602 begins to execute, it registers with the web application server 280 by storing as metadata its name and an associated ID that identifies it as an authentication engine. The metadata that is associated with an authentication engine is used by the object request broker 282 for system loading balancing. Load balancing is described in further detail below.

Upon receiving an authentication request, the authentication engine 602 parses the authentication request into one or more provider requests. The authentication engine 602 then sends the provider requests to the authentication host 604 via the object request broker 282 for distribution to the appropriate provider.

Upon receiving the provider requests from the authentication engine 602, the authentication host 604 forwards each provider request to the appropriate provider. When a provider receives a provider request, it determines whether access should be allowed based on the information contained in the provider request. The provider then sends a response message back up to the authentication engine 602 via the authentication host 604 and the object request broker 282 that indicates whether access should be allowed based on the information contained in the provider request.

After receiving the response messages from the providers that are associated with the authentication request, the authentication engine performs any necessary logical operations to determine if the browser request should be authorized to access the cartridge. The authentication engine then notifies the dispatcher of whether the browser request should be dispatched to the cartridge or that the browser should be notified that cartridge access was denied.

Processing Authentication Requests

Figure 7B:
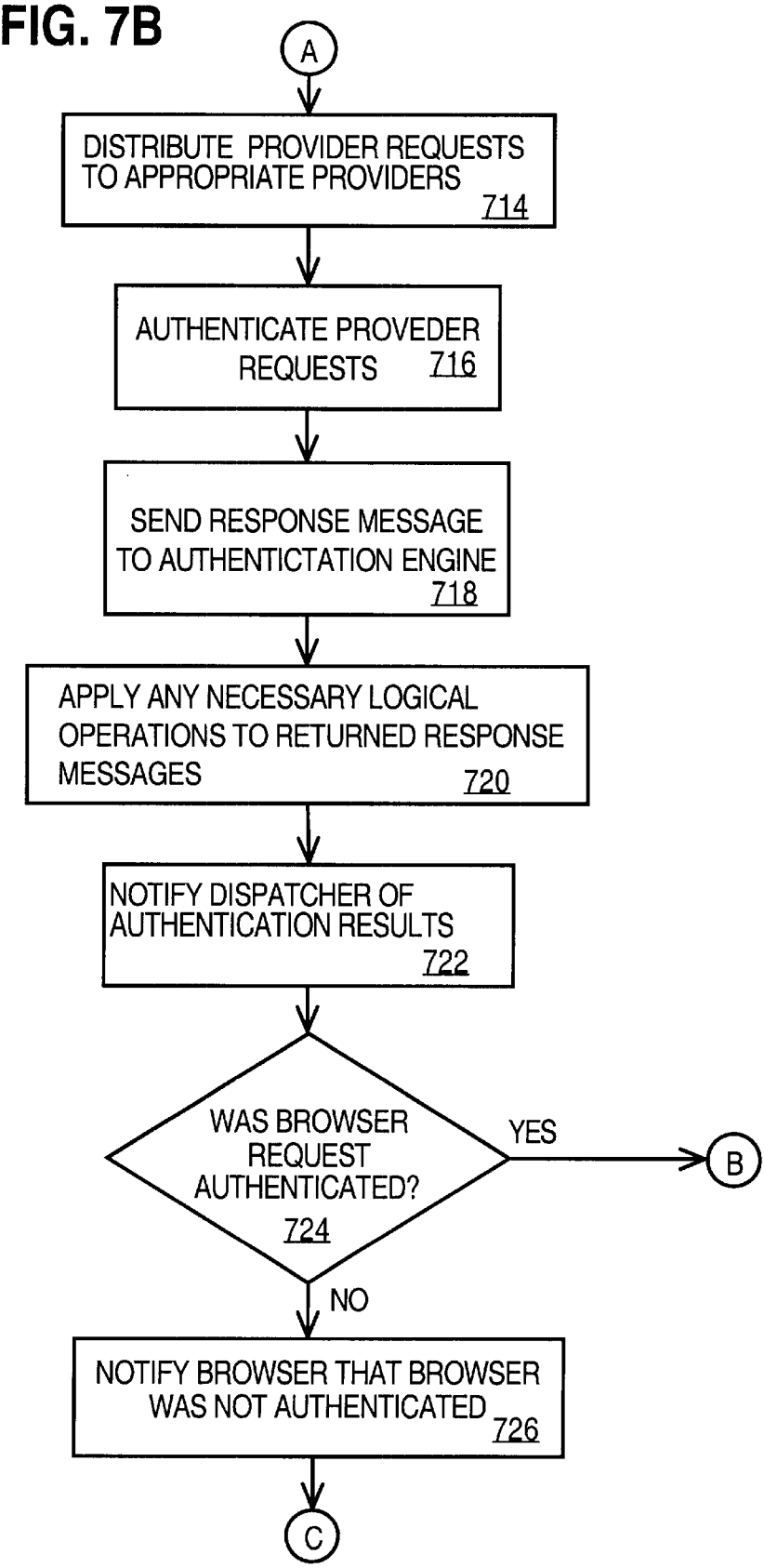
FIG. 7B is another portion of the flow chart illustrating steps for authenticating a browser request according to an embodiment of the invention.

FIGS. 7A and 7B are flow diagrams illustrating a method for authenticating browser requests in a stateless web environment according to an embodiment of the invention. For purposes of explanation, it shall be assumed that the browser request was issued by browser 202 and received by dispatcher 214. It shall also be assumed that the URL associated with the browser request is associated with the protect string "BASIC(GROUP1) AND IP(IP_LIST)" and that the browser request contains a username of "JIM", a password of "MANAGER" and an IP address of "192.6.25.3". In addition, is shall be assumed that provider 606 is a BASIC type provider and that provider 608 is an IP type provider.

At step 702, dispatcher 214 receives the browser request as described above. At step 704, dispatcher 214 communicates with virtual path manager 250 via the object request broker 282 to determine if the URL associated with the browser request requires authentication (e.g. is the URL associated with a protect string). If the URL is not associated with a protect string, then at step 706, dispatcher 214 dispatches the browser request to the appropriate cartridge. Control then returns to step 702 to receive another browser request.

If however the URL is associated with a protect string (i.e., as in this example), then at step 708, dispatcher 214 sends an authentication request (e.g. BASIC(Group1) JIM/MANAGER AND IP(IP_LIST) 192.6.25.3), to authentication engine 602 via the object request broker 282. At step 710, authentication engine 602 parses the authentication request into separate provider requests (e.g. BASIC (GROUP1) JIM/MANAGER, IP(IP_LIST) 192.6.25.3). At step 712, authentication engine 602 sends the provider requests to authentication host 604 via the object request broker 282 for distribution to the appropriate providers.

At step 714, the authentication host 604 sends the provider requests to the appropriate providers. In this example, the provider request of BASIC(GROUP1) JIM/MANAGER is sent to the provider 606 and the provider request of IP(IP_LIST) 192.6.25.3 is sent to the provider 608. At step 716, each provider determines whether access to the cartridge should be allowed based on the information contained in the provider request that they received. At step 718, each provider sends a response message to the authentication engine 602 via the authentication host 604 and the object request broker 282. In this example providers 606 and 608 send response messages to authentication engine 602

At step 720, authentication engine 602 applies any logical operations that were associated with the authentication request. In this example, authentication engine 602 applies the logical operation "AND" to the two response messages that were received from provider 606 and provider 608. At step 722, authentication engine 602 notifies dispatcher 214 via the object request broker 282 of the authentication results.

At step 724, dispatcher 214 uses the authentication results sent from authentication engine 602 to determine if the browser request was authenticated. If the browser request was not authenticated, dispatcher 214 notifies browser 202 that the browser request was not authenticated and that cartridge access is denied. Control then returns to step 702 to receive another browser request.

Otherwise, if the browser request was authenticated, dispatcher 214 dispatches the browser request to the appropriate cartridge. Control then returns to step 702 to receive another browser request.

Load Balancing

When authentication engines and authentication hosts begin to execute, they first register with the web application server 280 by storing as metadata specific information that will allow the object request broker 282 to perform authentication server loading balancing. Therefore, according to one embodiment, when the authentication engine begins to execute, it registers with the web application server 280 by storing as metadata its name and an associated ID that identifies it as an authentication engine. The metadata that is associated with an authentication engine is used by the object request broker 282 for system loading balancing.

In addition to the authentication engines, when an authentication host begins to execute, it registers with the web application server 280 by storing as metadata its name and an associated ID that identifies it as an authentication host. In addition, metadata is stored that identifies the one or more providers that are associated with the authentication host.

Figure 8:
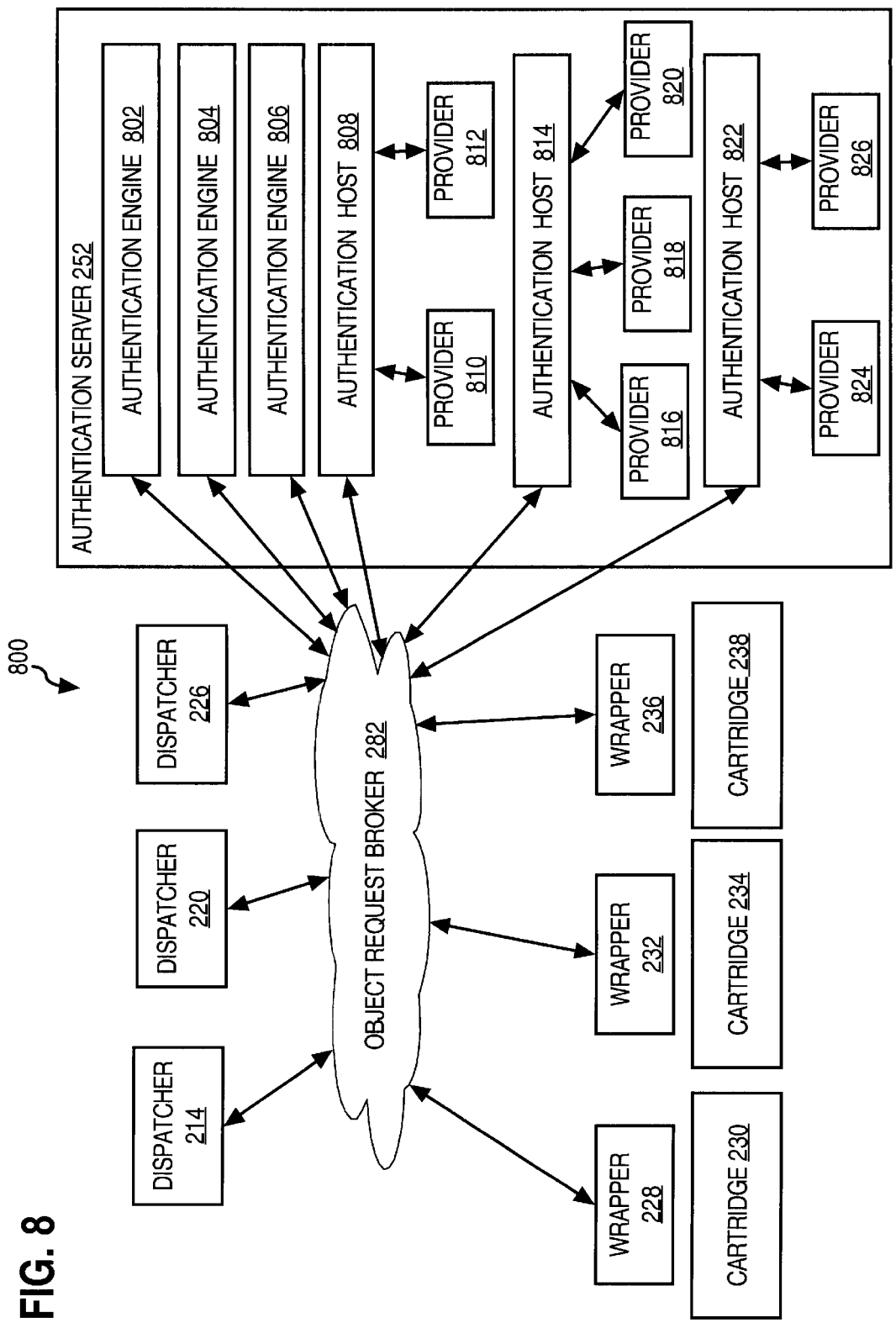
FIG. 8 is a block diagram of a distributed application server that provides for load balancing of an extensible authentication mechanism in a stateless web environment according to one embodiment of the invention.

FIG. 8 is a block diagram of a system 800 that provides for load balancing of an extensible authentication mechanism in a stateless web environment according to one embodiment of the invention. FIG. 8 is similar to FIG. 6 and therefore like components have been numbered alike.

As depicted in FIG. 8, authentication server 252 comprises a plurality of authentication engines 802, 804 and 806 that are connected and communicate with object request broker 282. Authentication server 252 also comprises a plurality of authentication hosts 808, 814 and 822 that are additionally connected and communicate with object request broker 282. As shown, authentication hosts 808, 814 and 822 are each associated with a plurality of providers.

When a dispatcher wants to communicate with an authentication engine, it requests to be assigned an authentication engine from the object request broker 282. In identifying a particular authentication engine, the object request broker 282 uses a load balancing scheme to attempt to balance the work load of the authentication engines. The object request broker 282 then identifies a particular authentication engine for use and then sends an authentication request to the particular authentication engine via the object request broker 282.

When the authentication engine receives the authentication request, it parses the authentication request into one or more provider requests. The authentication engine then requests the object request broker 282 to identify one or more authentication hosts that are associated with providers that can process the one or more provider requests. In identifying the one or more authentication hosts, the object request broker 282 again uses a load balancing scheme to attempt to balance the work load of the authentication hosts. After the object request broker 282 identifies the one or more authentication hosts, then sends the one or more provider requests to the one or more authentication hosts via the object request broker 282. The one or more authentication hosts then distribute the provider requests to the appropriate providers.

Once the providers have completed the authentication of the provider requests, they send response messages back to the authentication engine via the associated authentication host and the object request broker 282. Upon receiving the response messages from the one or more providers, the authentication engine performs any necessary logical operations on the returned response messages. The authentication engine then notifies the dispatcher whether the browser request should be forwarded to the appropriate cartridge or that the sending browser should be notified that access was denied.

Cartridge Authentication

In addition to dispatchers, cartridges also have the ability to authenticate browser requests. According to one embodiment of the invention, if the dispatcher determines that no authentication is required (i.e. no protect string associated with the browser request URL), the dispatcher dispatches the browser request to the associated cartridge and invokes the cartridge's own authenticate routine. The logic of the authenticate routine in the cartridge determines how the cartridge responds to an invocation of the authenticate routine. If use of a cartridge is unrestricted, the authenticate method of the cartridge may simply return "TRUE".

On the other hand, where authentication is required, the authenticate method may communicate with the authentication server in order to authenticate the browser request. For example, the authenticate method may cause the cartridge to interact with authentication server 252 in the same manner as dispatchers, as described above. In one embodiment, to authenticate the browser request itself, each cartridge uses the same authentication request format that a dispatcher would have used (i.e. protect string format). However, because the cartridge has no associated protect string, the cartridge itself determines what authentication parameters should be used.

If a cartridge decides to perform an authentication, it requests to be assigned an authentication engine from the object request broker 282. In identifying a particular authentication engine, the object request broker 282 uses a load balancing scheme to-attempt to balance the work load of the authentication engines. The object request broker 282 then identifies a particular authentication engine for use and notifies the cartridge. The cartridge then sends an authentication request to the particular authentication engine via the object request broker 282.

When the authentication engine receives the authentication request it parses the authentication request into one or more provider requests. The authentication engine then requests the object request broker 282 to identify one or more authentication hosts that are associated with providers that can process the one or more provider requests. In identifying the one or more authentication hosts, the object request broker 282 again uses a load balancing scheme to attempt to balance the work load of the authentication hosts. After the object request broker 282 identifies the one or more authentication hosts, it then notifies the authentication engine. The authentication engine then sends the one or more provider requests to the one or more authentication hosts via the object request broker 282. The one or more authentication hosts then distribute the provider requests to the appropriate providers.

Once the providers have completed the authentication of the provider requests, they send response messages back to the authentication engine via the associated authentication host and the object request broker 282. Upon receiving the response messages from the one or more providers, the authentication engine performs any necessary logical operations on the returned responses messages. The authentication engine then notifies the cartridge whether the browser request should be allowed to access the cartridge.

The present invention provides a highly scalable, flexible, and extensible mechanism for authenticating client requests. While many advantages will be clear to those of ordinary skill in the art with the benefit of this disclosure, several particular advantages should be noted here.

First, note that the authentication server is distributed. Because the object request broker is used as the underlying communication mechanism, and because the object request broker is a machine independent communication mechanism, the various components, such as the authentication engine and the authentication host, can reside on any combination of different machines (i.e. can be distributed). Regardless of the machine configuration, they will be able to communicate with each other through the object request broker. The distributed nature of the present invention makes it possible to strategically add machines where additional capability is most needed. For example, if additional authentication capability is needed, a machine can be added to run an additional authentication engine. The ability to freely expand the system by adding more machines makes the present invention highly scalable.

Second, the present invention improves efficiency by load balancing. By balancing the load across multiple authentication engines and hosts as previously described, the present invention minimizes potential bottlenecks and maximizes efficient use of available resources.

Third, the present invention makes it possible to alter system implementation at deployment time. As discussed previously, each provider preferably takes the form of a DLL which can be linked into the system at run time. Because the provider modules are linked in at run time, it is possible, at deployment time, to: (1) replace one provider with another provider; and (2) to add another provider to the system. Due to the architecture of the authentication server, all of this can be done without changing or recompiling any of the other modules (e.g. the authentication engine and the authentication host). All that needs to be done is to update the metadata to reflect the replacement/addition of the providers. This aspect of the present invention makes it highly flexible and easily extensible. In addition, it should be noted that the authentication schemes associated a particular query can be easily changed at deployment time. All that needs to be altered is the protect string associated with that query. Thus, for example, a query which currently requires the BASIC and IP authentication schemes can be changed to require only the IP scheme by simply changing the protect string from:

URL1 CARTRIDGE_238 BASIC(GROUP1) AND IP(IP_LIST) to

URL1 CARTRIDGE_238 IP(IP_LIST).

Thus, altering the implementation of the server at deployment time is quite easy.

Fourth, note that the present invention removes much if not all of the burden of authenticating requests from the cartridges. By having the authentication server implement the authentication process for each cartridge, the need for cartridges to authenticate requests is obviated.

Overall, the present invention provides a highly effective and advantageous mechanism for authenticating client requests.

In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative rather than a restrictive sense.

What is claimed is:

1. A method for determining whether an operation is authorized, wherein the operation is to be performed by a cartridge executing on a first machine, the method comprising the steps of:

executing a dispatcher on a second machine, wherein the dispatcher is a component configured to receive requests for multiple destinations and to route each of said multiple requests to one or more of said multiple destinations; wherein said multiple destinations include said cartridge and one or more destinations other than said cartridge;

executing at least one component of an authentication server on a third machine;

receiving a request at said dispatcher from a client executing on a machine that is different from said second machine;

sending a first message, transparent to said client and said cartridge, from the dispatcher to the authentication server, wherein the first message contains authorization information that is associated with the cartridge;

sending a second message, transparent to said client and said cartridge, from the authentication server to the dispatcher, wherein the second message indicates whether the operation is authorized to be performed by the cartridge;

if the operation is authorized to be performed by the cartridge, sending a third message from the dispatcher to the cartridge to cause the cartridge to perform the operation; and wherein at least two of the first machine, the second machine and the third machine are separate machines.

2. The method of claim 1 further comprising the steps of:

a browser sending a browser request to a web listener;

the web listener passing the browser request to the dispatcher;

wherein the dispatcher sends the first message in response to receiving the browser request from the web listener.

3. The method of claim 1 wherein:

the first machine and the second machine are separate machines;

the step of sending the first message from the dispatcher to the authentication server is performed by sending the first message from the dispatcher to the authentication server through an object request broker; and the step of sending the second message from the authentication server to the dispatcher is performed by sending the second message from the authentication server to the dispatcher through the object request broker.

4. The method of claim 1 wherein the step of sending the first message from the dispatcher to the authentication server includes the step of the authentication server determining whether the operation should be authorized to be performed by the cartridge based on the information associated with the first message.

5. The method of claim 1 wherein the step of executing at least one component of the authentication server on the third machine includes the steps of:

executing an authentication engine on a the third machine;

executing an authentication host on a fourth machine; and wherein the third machine and the fourth machine are separate machines.

6. The method of claim 4 further including the steps of:

sending the first message to an authentication engine;

parsing the first message into one or more fourth messages;

sending the one or more fourth messages to an authentication host, where the authentication host is associated with one or more providers; and distributing the one or more fourth messages to the one or more providers, wherein the one or more providers perform authentication on the one or more fourth messages.

7. The method of claim 6, further comprising the steps of:

sending one or more response messages to the authentication engine based on the authentication performed on the one or more fourth messages; and determining whether the operation should be authorized to be performed by the cartridge based on the one or more response messages.

8. The method of claim 6 wherein:

the step of sending the first message from the dispatcher to the authentication engine includes the step of sending the first message from the dispatcher to the authentication engine through an object request broker; and the step of sending the one or more fourth messages to the authentication host includes the step of sending the one or more fourth messages to the authentication host through the object request broker.

9. The method of claim 8 further including the steps of:

executing a plurality of authentication engines;

executing a plurality of authentication hosts;

selecting a particular authentication engine to receive the first message from the dispatcher; and selecting one or more authentication hosts to receive the one or more fourth messages.

10. The method of claim 9 wherein:

the step of selecting the particular authentication engine to receive the first message from the dispatcher includes the step of the object request broker selecting the particular authentication engine to receive the first message; and the step of selecting one or more authentication hosts to receive the one or more fourth messages includes the step of the object request broker selecting the one or more authentication hosts to receive the one or more fourth messages.

11. The method of claim 9 wherein:

the step of selecting the particular authentication engine includes the step of selecting the particular authentication engine based on the work load of the plurality of authentication engines; and selecting one or more authentication hosts includes the step of selecting the one or more authentication hosts based on the work load of the plurality of authentication hosts.

12. The method of claim 6 further including the step of dynamically associating and disassociating providers with the authentication host.

13. The method of claim 1 further includes the step of the authentication server performing a logical operation to combine the results received from two or more providers.

14. The method of claim 1 further includes the step of, prior to sending the first message, causing the dispatcher to determine which providers of a plurality of providers should be used to authenticate the operation.

15. The method of claim 1 wherein the step of sending the first message from the dispatcher to the authentication server includes the step of the dispatcher determining whether to send the first message to the authentication server based on a protect string.

16. The method of claim 6 wherein the one or more providers represent a plurality of providers each of which perform authentication based on a distinct set of criteria.

17. A computer-readable medium carrying one or more sequences of instructions for determining whether an operation is authorized, wherein the operation is to be performed by a cartridge executing on a first machine, wherein execution of the one or sequences of instructions by one or more processors causes the one or more processors to perform the steps of:

executing a dispatcher on a second machine, wherein the dispatcher is a component configured to receive requests for multiple destinations and to route each of said multiple requests to one or more of said multiple destinations; wherein said multiple destinations include said cartridge and one or more destinations other than said cartridge;

executing at least one component of an authentication server on a third machine;

receiving a request at said dispatcher from a client executing on a machine that is different from said second machine;

sending a first message, transparent to said client and said cartridge, from the dispatcher to the authentication server, wherein the first message contains authorization information that is associated with the cartridge;

sending a second message, transparent to said client and said cartridge, from the authentication server to the dispatcher, wherein the second message indicates whether the operation is authorized to be performed by the cartridge;

if the operation is authorized to be performed by the cartridge, sending a third message from the dispatcher to the cartridge to cause the cartridge to perform the operation; and wherein at least two of the first machine, the second machine and the third machine are separate machines.

18. The computer-readable medium of claim 17 further comprising instructions for performing the steps of:

a browser sending a browser request to a web listener;

the web listener passing the browser request to the dispatcher;

wherein the dispatcher sends the first message in response to receiving the browser request from the web listener.

19. The computer-readable medium of claim 17 wherein:

the first machine and the second machine are separate machines;

the step of sending the first message from the dispatcher to the authentication server is performed by sending the first message from the dispatcher to the authentication server through an object request broker; and the step of sending the second message from the authentication server to the dispatcher is performed by sending the second message from the authentication server to the dispatcher through the object request broker.

20. The computer-readable medium of claim 17 wherein the step of sending the first message from the dispatcher to the authentication server includes the step of the authentication server determining whether the operation should be authorized to be performed by the cartridge based on the information associated with the first message.

21. The computer-readable medium of claim 17 wherein the step of executing at least one component of the authentication server on the third machine includes the steps of:

executing an authentication engine on a the third machine;

executing an authentication host on a fourth machine; and wherein the third machine and the fourth machine are separate machines.

22. The computer-readable medium of claim 20 further comprising instructions for performing the steps of:

sending the first message to an authentication engine;

parsing the first message into one or more fourth messages;

sending the one or more fourth messages to an authentication host, where the authentication host is associated with one or more providers; and distributing the one or more fourth messages to the one or more providers, wherein the one or more providers perform authentication on the one or more fourth messages.

23. The computer-readable medium of claim 22 further comprising instructions for performing the steps of:

sending one or more response messages to the authentication engine based on the authentication performed on the one or more fourth messages; and determining whether the operation should be authorized to be performed by the cartridge based on the one or more response messages.

24. The computer-readable medium of claim 22 wherein:

the step of sending the first message from the dispatcher to the authentication engine includes the step of sending the first message from the dispatcher to the authentication engine through an object request broker; and the step of sending the one or more fourth messages to the authentication host includes the step of sending the one or more fourth messages to the authentication host through the object request broker.

25. The computer-readable medium of claim 24 further comprising instructions for performing the steps of:

executing a plurality of authentication engines;

executing a plurality of authentication hosts;

selecting a particular authentication engine to receive the first message from the dispatcher; and selecting one or more authentication hosts to receive the one or more fourth messages.

26. The computer-readable medium of claim 25 wherein:

the step of selecting the particular authentication engine to receive the first message from the dispatcher includes the step of the object request broker selecting the particular authentication engine to receive the first message; and the step of selecting one or more authentication hosts to receive the one or more fourth messages includes the step of the object request broker selecting the one or more authentication hosts to receive the one or more fourth messages.

27. The computer-readable medium of claim 25 wherein:

the step of selecting the particular authentication engine includes the step of selecting the particular authentication engine based on the work load of the plurality of authentication engines; and selecting one or more authentication hosts includes the step of selecting the one or more authentication hosts based on the work load of the plurality of authentication hosts.

28. The computer-readable medium of claim 22 further comprising instructions for performing the step of dynamically associating and disassociating providers with the authentication host.

29. The computer-readable medium of claim 17 further comprising instructions for performing the step of the authentication server performing a logical operation to combine the results received from two or more providers.

30. The computer-readable medium of claim 17 further comprises instructions for performing the step of, prior to sending the first message, causing the dispatcher to determine which providers of a plurality of providers should be used to authenticate the operation.

31. The computer-readable medium of claim 17 wherein the step of sending the first message from the dispatcher to the authentication server includes the step of the dispatcher determining whether to send the first message to the authentication server based on a protect string.

32. The computer-readable medium of claim 22 wherein the one or more providers represent a plurality of providers each of which perform authentication based on a distinct set of criteria.

33. A system for determining whether an operation is authorized, wherein the operation is to be performed by a cartridge executing on a first machine, the system comprising:

a plurality of dispatchers coupled to a plurality of web listeners, wherein each dispatcher of said plurality of dispatchers receives from a corresponding web listener of said plurality web listeners browser requests received by said corresponding web listener, wherein browser requests received by said corresponding web listener are received from a client executing on a different machine than said corresponding web listener;

a virtual path manager coupled to said plurality of dispatchers through an inter-machine communication mechanism, said virtual path manager indicating to said dispatchers whether a particular browser request requires authentication;

said plurality of dispatchers being coupled to a plurality of authentication servers, wherein said plurality of dispatchers is configured to send, transparent to said client and said cartridge, a plurality messages through said inter-machine communication mechanism to plurality of authentication servers;

said plurality of authentication servers being able to authenticate said plurality messages sent from said plurality of dispatchers, wherein the plurality of authentication servers notify the plurality of dispatchers, transparent to said client and said cartridge, of whether the particular browser request is authorized to execute on the cartridge.

34. The system of claim 33 wherein the inter-machine communication mechanism is an object request broker.

35. The system of claim 33 wherein the plurality of authentication servers are comprised of a plurality of authentication engines and a plurality of authentication hosts.

36. The system of claim 35 wherein the plurality of authentication hosts are associated with a plurality of providers.

* * * * *